United States Patent
Porat et al.

(10) Patent No.: US 9,825,796 B2
(45) Date of Patent: Nov. 21, 2017

(54) LONG TRAINING FIELD (LTF) WITHIN WIRELESS COMMUNICATIONS

(71) Applicant: BROADCOM CORPORATION, Irvine, CA (US)

(72) Inventors: Ron Porat, San Diego, CA (US); Leo Montreuil, Atlanta, GA (US)

(73) Assignee: AVAGO TECHNOLOGIES GENERAL IP (SINGAPORE) PTE. LTD, Singapore (SG)

(*) Notice: Subject to any disclaimer, the term of this patent is extended or adjusted under 35 U.S.C. 154(b) by 132 days.

(21) Appl. No.: 15/011,496

(22) Filed: Jan. 30, 2016

(65) Prior Publication Data

US 2016/0262139 A1    Sep. 8, 2016

Related U.S. Application Data

(60) Provisional application No. 62/128,481, filed on Mar. 4, 2015, provisional application No. 62/156,234, filed
(Continued)

(51) Int. Cl.
*H04L 27/26* (2006.01)
*H04L 5/00* (2006.01)
(Continued)

(52) U.S. Cl.
CPC ............ *H04L 27/2656* (2013.01); *H04L 1/00* (2013.01); *H04L 5/0007* (2013.01); *H04W 40/02* (2013.01);
(Continued)

(58) Field of Classification Search
CPC ..... H04L 27/2656; H04L 1/00; H04L 5/0007; H04L 1/0025; H04L 1/0072; H04L 1/0075; H04W 40/02; H04W 72/044
See application file for complete search history.

(56) References Cited

U.S. PATENT DOCUMENTS

2011/0013607 A1*  1/2011  Van Nee ............ H04L 27/2613
                                                           370/338
2012/0269124 A1* 10/2012  Porat ................. H04W 72/1231
                                                           370/328
(Continued)

*Primary Examiner* — Benjamin H Elliott, IV
(74) *Attorney, Agent, or Firm* — Garlick & Markison; Shayne X. Short

(57) ABSTRACT

A wireless communication device (alternatively, device) includes a processor configured to support communications with other wireless communication device(s) and to generate and process signals for such communications. In some examples, the device includes a communication interface and a processor, among other possible circuitries, components, elements, etc. to support communications with other wireless communication device(s) and to generate and process signals for such communications. Different long training fields (LTFs) are designed using different respective binary sequences. The LTFs are designs based on a number of resource units (RUs) and RU sizes associated with a sub-carriers/tone plan. Each RU allocation specifies a respective one or more RUs of one or more RU sizes for a communication channel. The LTFs are designed such that peak to average power ratio (PAPR) of the LTF increases across the RU allocations as size of the one or more RU sizes increases.

20 Claims, 9 Drawing Sheets

Related U.S. Application Data on May 2, 2015, provisional application No. 62/216,330, filed on Sep. 9, 2015, provisional application No. 62/235,837, filed on Oct. 1, 2015, provisional application No. 62/240,262, filed on Oct. 12, 2015, provisional application No. 62/250,207, filed on Nov. 3, 2015, provisional application No. 62/256,040, filed on Nov. 16, 2015, provisional application No. 62/258,225, filed on Nov. 20, 2015, provisional application No. 62/288,544, filed on Jan. 29, 2016, provisional application No. 62/288,583, filed on Jan. 29, 2016.

(51) Int. Cl.
*H04W 40/02* (2009.01)
*H04W 72/04* (2009.01)
*H04L 1/00* (2006.01)

(52) U.S. Cl.
CPC ......... *H04W 72/044* (2013.01); *H04L 1/0025* (2013.01); *H04L 1/0072* (2013.01); *H04L 1/0075* (2013.01); *Y02B 60/50* (2013.01)

(56) References Cited

U.S. PATENT DOCUMENTS

| | | | |
|---|---|---|---|
| 2013/0242963 A1* | 9/2013 | Van Nee | H04L 27/2613 370/338 |
| 2016/0262139 A1* | 9/2016 | Porat | H04L 27/2656 |

* cited by examiner

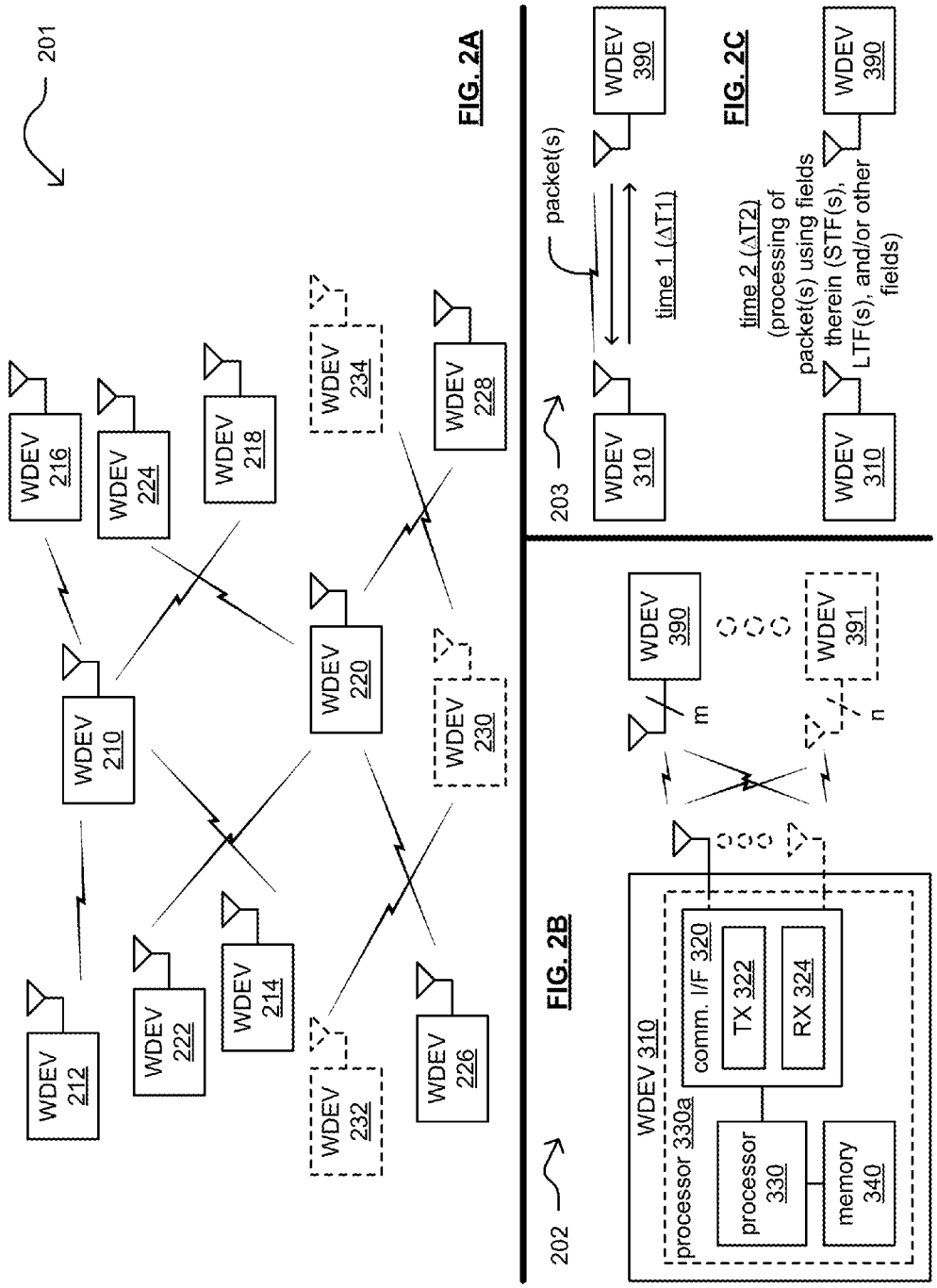

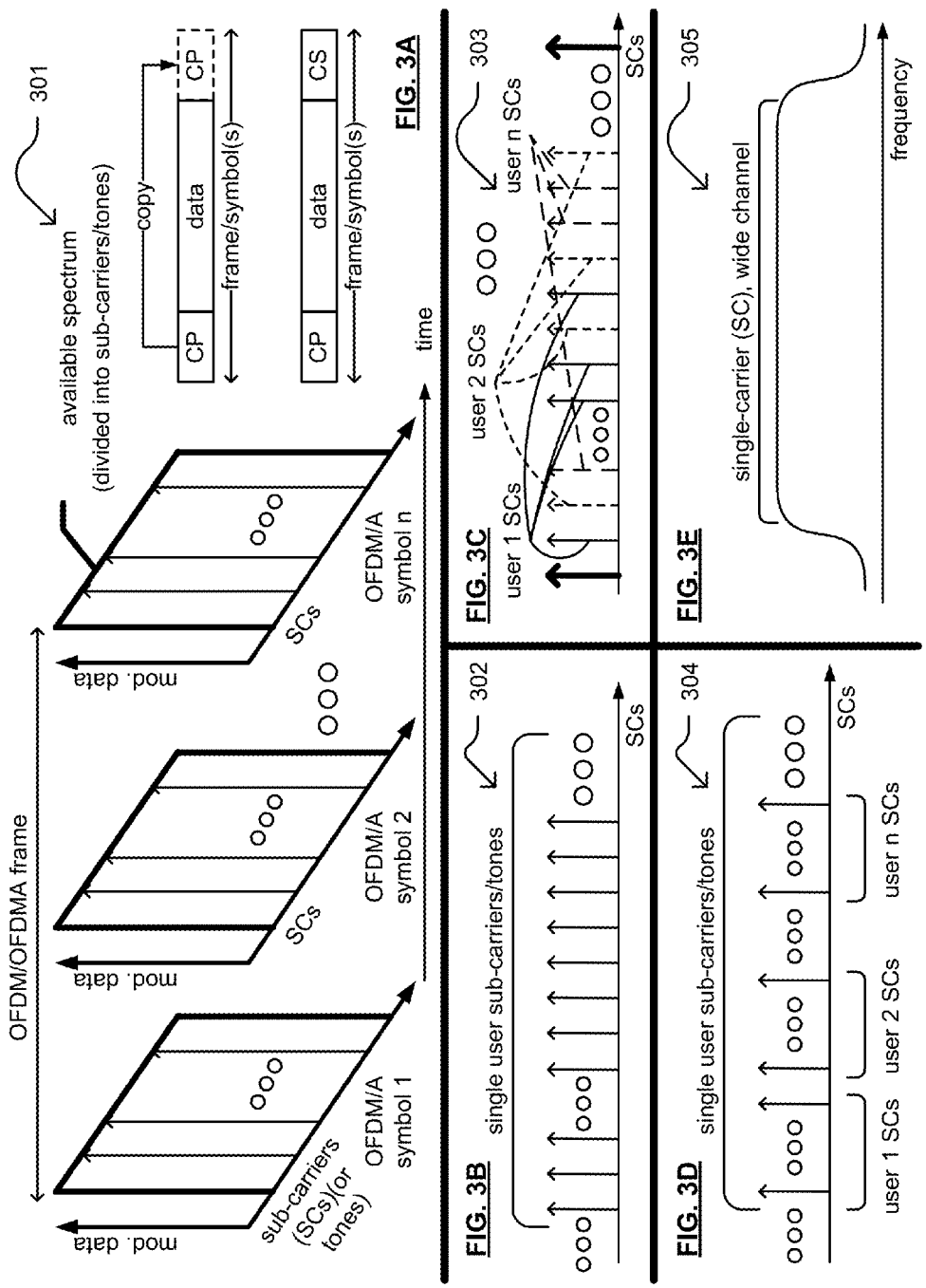

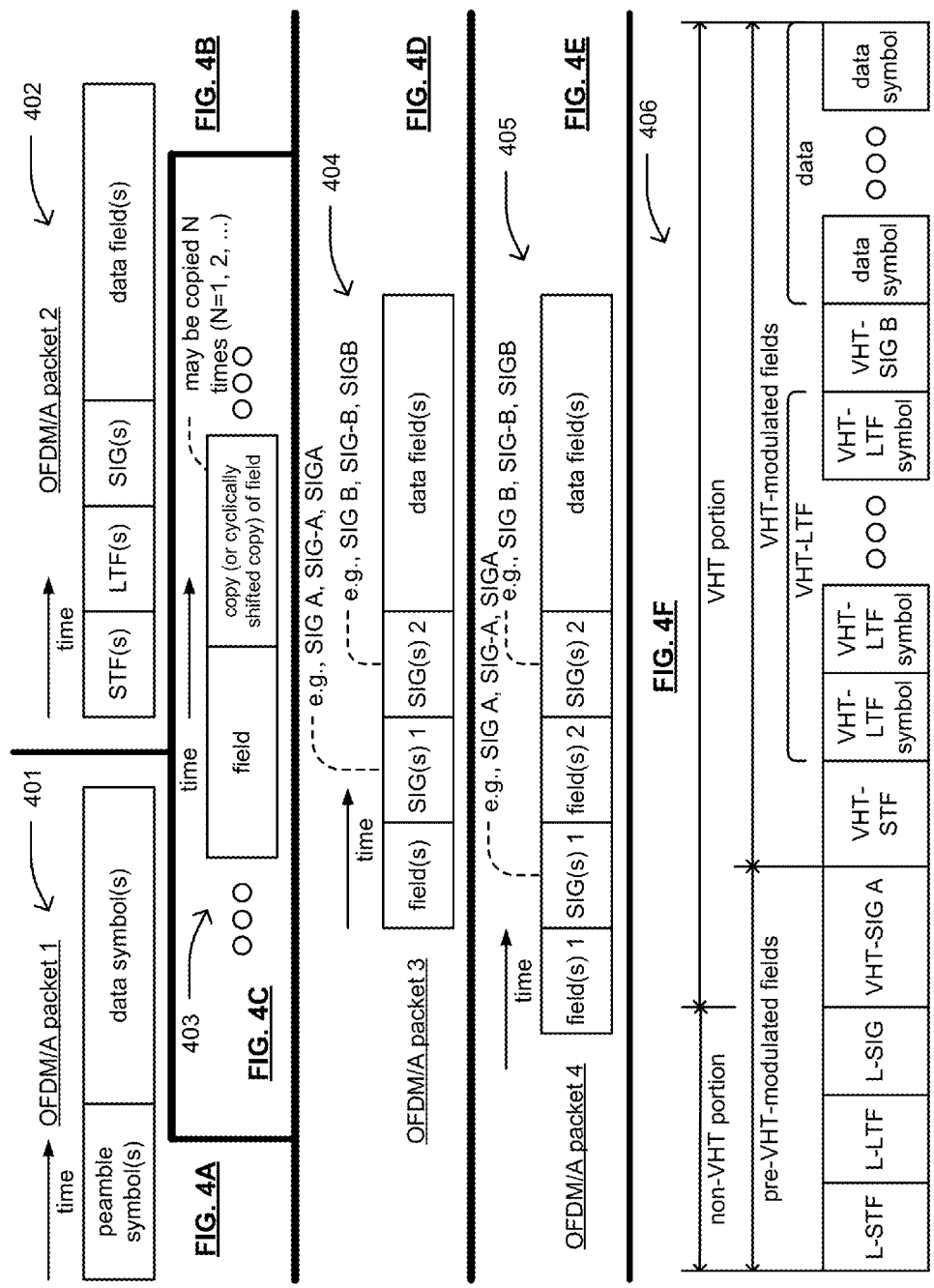

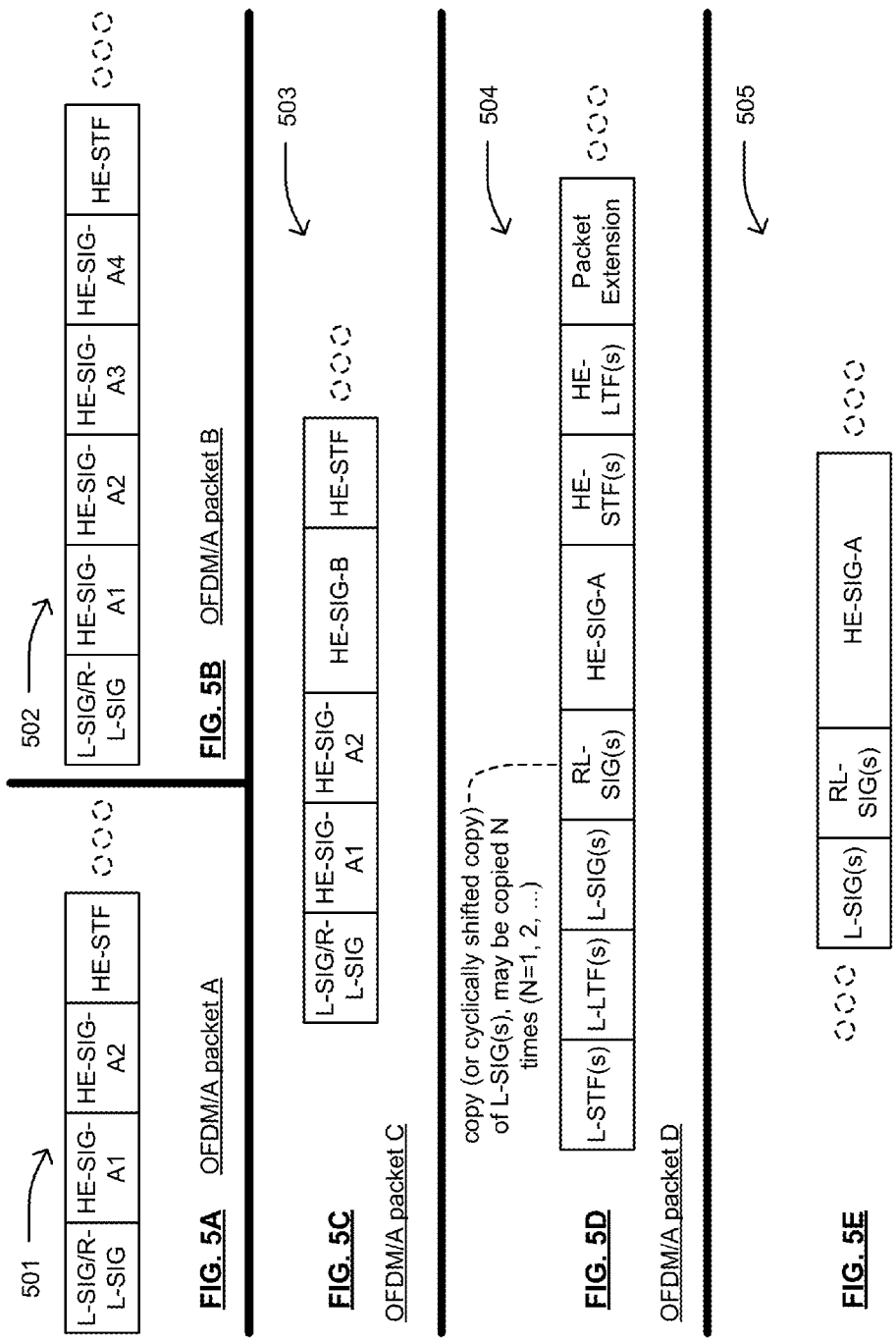

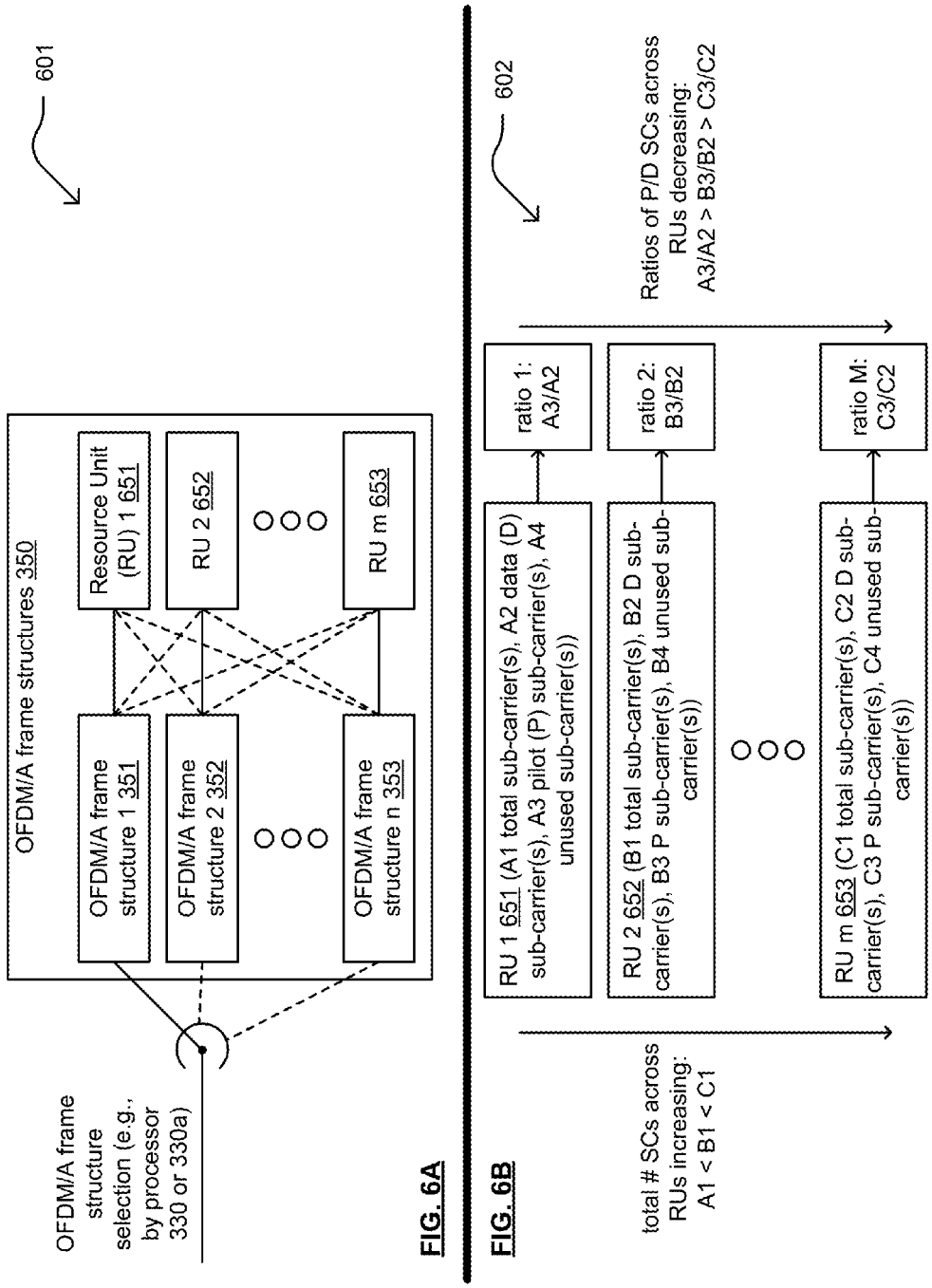

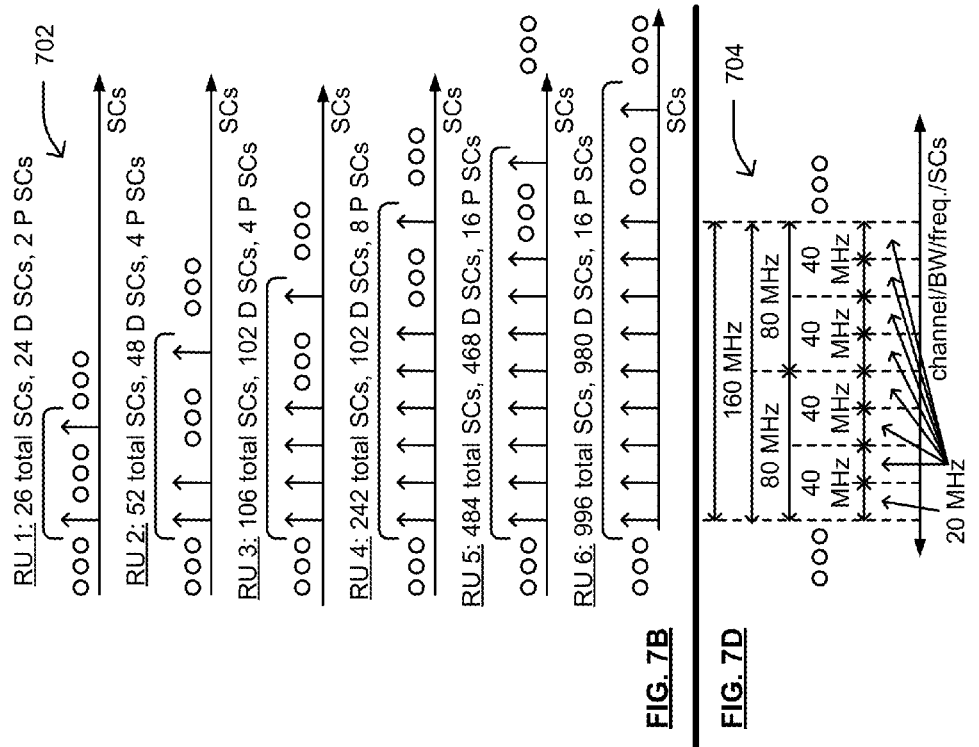
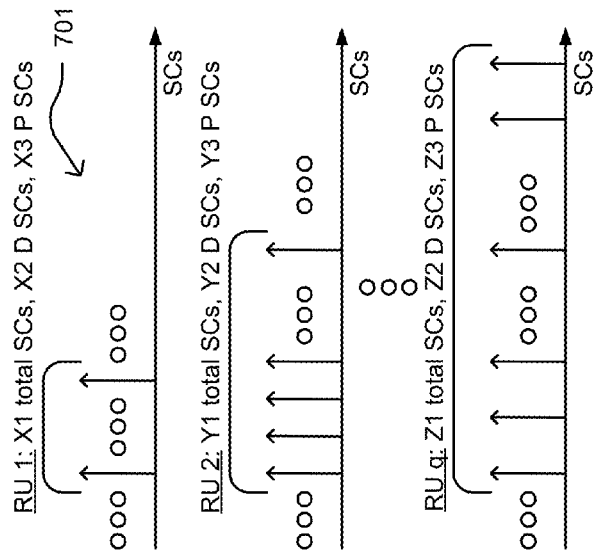
FIG. 7A
FIG. 7B
FIG. 7C
FIG. 7D

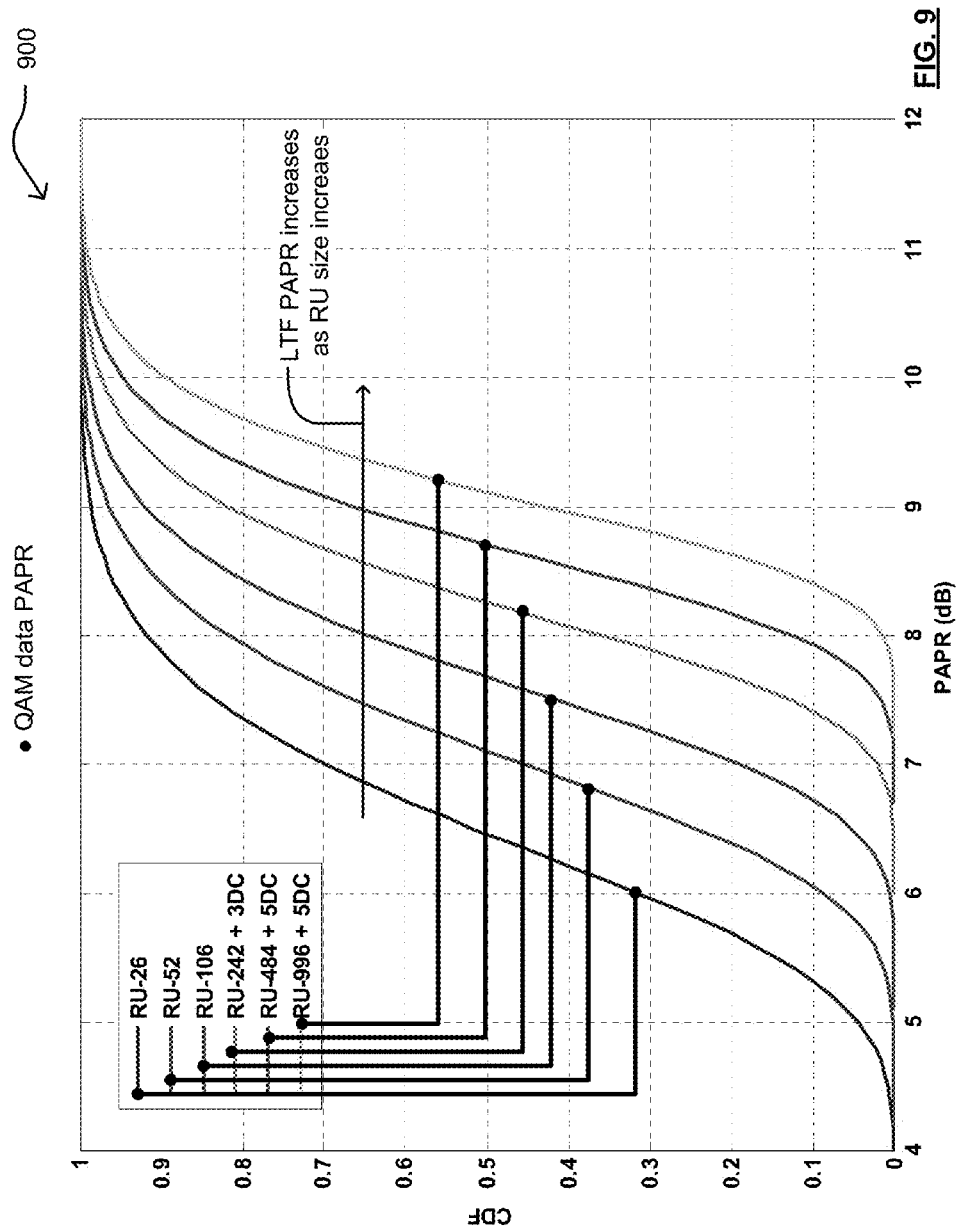

LONG TRAINING FIELD (LTF) WITHIN WIRELESS COMMUNICATIONS

CROSS REFERENCE TO RELATED PATENTS/PATENT APPLICATIONS

Provisional Priority Claims

The present U.S. Utility patent application claims priority pursuant to 35 U.S.C. §119(e) to U.S. Provisional Patent App. Ser. No. 62/128,481, entitled "Short training field (STF) sequences within wireless communications," filed Mar. 4, 2015; U.S. Provisional Patent App. Ser. No. 62/156,234, entitled "Short training field (STF) sequences within wireless communications," filed May 2, 2015; U.S. Provisional Patent App. Ser. No. 62/216,330, entitled "Short training field (STF) and/or long training field (LTF) sequences within wireless communications," filed Sep. 9, 2015; U.S. Provisional Patent App. Ser. No. 62/235,837, entitled "Short training field (STF) and/or long training field (LTF) sequences within wireless communications," filed Oct. 1, 2015; U.S. Provisional Patent App. Ser. No. 62/240,262, entitled "Short training field (STF) and/or long training field (LTF) sequences within wireless communications," filed Oct. 12, 2015; U.S. Provisional Patent App. Ser. No. 62/250,207, entitled "Short training field (STF) and/or long training field (LTF) sequences within wireless communications," filed Nov. 3, 2015; U.S. Provisional Patent App. Ser. No. 62/256,040, entitled "Short training field (STF) and/or long training field (LTF) sequences within wireless communications," filed Nov. 16, 2015; U.S. Provisional Patent App. Ser. No. 62/258,225, entitled "Short training field (STF) and/or long training field (LTF) sequences within wireless communications," filed Nov. 20, 2015; U.S. Provisional Patent App. Ser. No. 62/288,544, entitled "Short training field (STF) within wireless communications," filed Jan. 29, 2016; and U.S. Provisional Patent App. Ser. No. 62/288,583, entitled "Long training field (LTF) within wireless communications," filed Jan. 29, 2016; all of which are hereby incorporated herein by reference in their entirety and made part of the present U.S. Utility patent application for all purposes.

INCORPORATION BY REFERENCE

The following U.S. Utility patent application is hereby incorporated herein by reference in its entirety and made part of the present U.S. Utility patent application for all purposes:

1. U.S. Utility patent application Ser. No. 15/011,493, entitled "Short training field (STF) within wireless communications," filed concurrently on Jan. 30, 2016, pending.

BACKGROUND

Technical Field

The present disclosure relates generally to communication systems; and, more particularly, to preamble design for signals within single user, multiple user, multiple access, and/or multiple-input-multiple-output (MIMO) wireless communications.

Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into radio frequency (RF) signals that are transmitted to a RX that includes two or more antennae and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennae to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

There continues to be room for improvement of various signal designs for use in wireless communication systems. There continues to be room for improvement in the art to design various signals used for various purposes including channel estimation, channel characteristic, etc.

BRIEF DESCRIPTION OF THE SEVERAL VIEWS OF THE DRAWINGS

FIG. 2A is a diagram illustrating an embodiment of dense deployment of wireless communication devices.

FIG. 2B is a diagram illustrating an example of communication between wireless communication devices.

FIG. 2C is a diagram illustrating another example of communication between wireless communication devices.

FIG. 3A is a diagram illustrating an example of orthogonal frequency division multiplexing (OFDM) and/or orthogonal frequency division multiple access (OFDMA).

FIG. 3B is a diagram illustrating another example of OFDM and/or OFDMA.

FIG. 3C is a diagram illustrating another example of OFDM and/or OFDMA.

FIG. 3D is a diagram illustrating another example of OFDM and/or OFDMA.

FIG. 3E is a diagram illustrating an example of single-carrier (SC) signaling.

FIG. 4A is a diagram illustrating an example of an OFDM/A packet.

FIG. 4B is a diagram illustrating another example of an OFDM/A packet of a second type.

FIG. 4C is a diagram illustrating an example of at least one portion of an OFDM/A packet of another type.

FIG. 4D is a diagram illustrating another example of an OFDM/A packet of a third type.

FIG. 4E is a diagram illustrating another example of an OFDM/A packet of a fourth type.

FIG. 4F is a diagram illustrating another example of an OFDM/A packet.

FIG. 5A is a diagram illustrating another example of an OFDM/A packet.

FIG. 5B is a diagram illustrating another example of an OFDM/A packet.

FIG. 5C is a diagram illustrating another example of an OFDM/A packet.

FIG. 5D is a diagram illustrating another example of an OFDM/A packet.

FIG. 5E is a diagram illustrating another example of an OFDM/A packet.

FIG. 6A is a diagram illustrating an example of selection among different OFDM/A frame structures for use in communications between wireless communication devices and specifically showing OFDM/A frame structures corresponding to one or more resource units (RUs).

FIG. 6B is a diagram illustrating an example of various types of different resource units (RUs).

FIG. 7A is a diagram illustrating another example of various types of different RUs.

FIG. 7B is a diagram illustrating another example of various types of different RUs.

FIG. 7C is a diagram illustrating an example of various types of communication protocol specified physical layer (PHY) fast Fourier transform (FFT) sizes.

FIG. 7D is a diagram illustrating an example of different channel bandwidths and relationship there between.

FIG. 9 is a diagram illustrating an example of quadrature amplitude modulation (QAM) data peak to average power ratio (PAPR) (shown as cumulative distribution function (CDF) as a function of PAPR (dB)).

DETAILED DESCRIPTION

Figure 1:
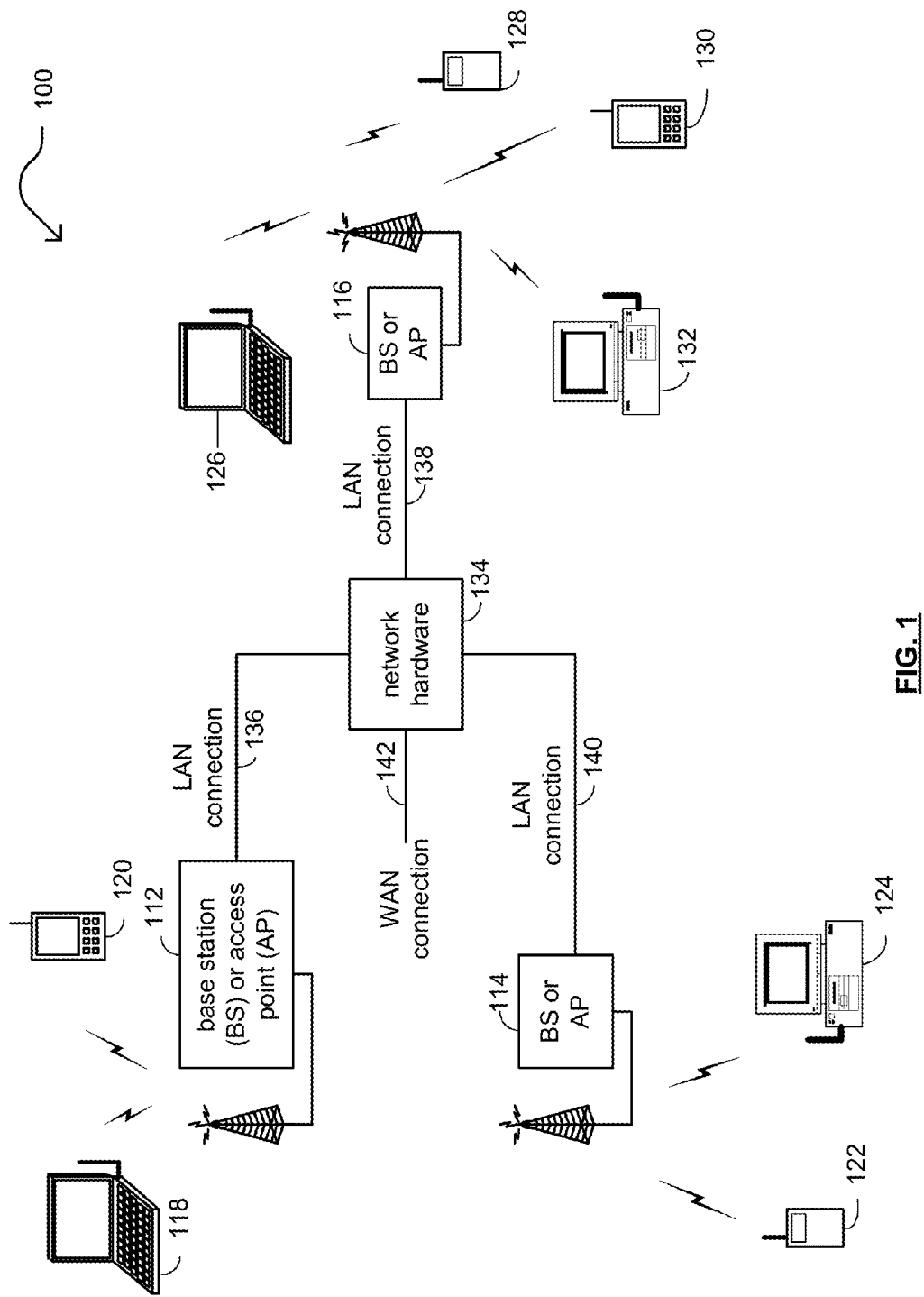
FIG. 1 is a diagram illustrating an embodiment of a wireless communication system.

FIG. 1 is a diagram illustrating an embodiment of a wireless communication system 100. The wireless communication system 100 includes base stations and/or access points 112-116, wireless communication devices 118-132 (e.g., wireless stations (STAs)), and a network hardware component 134. The wireless communication devices 118-132 may be laptop computers, or tablets, 118 and 126, personal digital assistants 120 and 130, personal computers 124 and 132 and/or cellular telephones 122 and 128. Other examples of such wireless communication devices 118-132 could also or alternatively include other types of devices that include wireless communication capability. The details of an embodiment of such wireless communication devices are described in greater detail with reference to FIG. 2B among other diagrams.

Some examples of possible devices that may be implemented to operate in accordance with any of the various examples, embodiments, options, and/or their equivalents, etc. described herein may include, but are not limited by, appliances within homes, businesses, etc. such as refrigerators, microwaves, heaters, heating systems, air conditioners, air conditioning systems, lighting control systems, and/or any other types of appliances, etc.; meters such as for natural gas service, electrical service, water service, Internet service, cable and/or satellite television service, and/or any other types of metering purposes, etc.; devices wearable on a user or person including watches, monitors such as those that monitor activity level, bodily functions such as heartbeat, breathing, bodily activity, bodily motion or lack thereof, etc.; medical devices including intravenous (IV) medicine delivery monitoring and/or controlling devices, blood monitoring devices (e.g., glucose monitoring devices) and/or any other types of medical devices, etc.; premises monitoring devices such as movement detection/monitoring devices, door closed/ajar detection/monitoring devices, security/alarm system monitoring devices, and/or any other type of premises monitoring devices; multimedia devices including televisions, computers, audio playback devices, video playback devices, and/or any other type of multimedia devices, etc.; and/or generally any other type(s) of device(s) that include(s) wireless communication capability, functionality, circuitry, etc. In general, any device that is implemented to support wireless communications may be implemented to operate in accordance with any of the various examples, embodiments, options, and/or their equivalents, etc. described herein.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices (WDEVs) 118-132 and BSs or APs 112-116 may include a processor and/or a communication interface to support communications with any other of the wireless communication devices 118-132 and BSs or APs 112-116. In an example of operation, a processor and/or a communication interface implemented within one of the devices (e.g., any one of the WDEVs 118-132 and BSs or APs 112-116) is/are configured to process at least one signal received from and/or to generate at least one signal to be transmitted to another one of the devices (e.g., any other one of the WDEVs 118-132 and BSs or APs 112-116).

Note that general reference to a communication device, such as a wireless communication device (e.g., WDEVs) 118-132 and BSs or APs 112-116 in FIG. 1, or any other communication devices and/or wireless communication devices may alternatively be made generally herein using the term 'device' (e.g., with respect to FIG. 2A below, "device 210" when referring to "wireless communication device 210" or "WDEV 210," or "devices 210-234" when referring to "wireless communication devices 210-234"; or with respect to FIG. 2B below, use of "device 310" may alternatively be used when referring to "wireless communication device 310", or "devices 390 and 391 (or 390-391)" when referring to wireless communication devices 390 and 391 or WDEVs 390 and 391). Generally, such general references or designations of devices may be used interchangeably.

The processor and/or the communication interface of any one of the various devices, WDEVs 118-132 and BSs or APs 112-116, may be configured to support communications with any other of the various devices, WDEVs 118-132 and BSs or APs 112-116. Such communications may be uni-directional or bi-directional between devices. Also, such communications may be uni-directional between devices at one time and bi-directional between those devices at another time.

In an example, a device (e.g., any one of the WDEVs 118-132 and BSs or APs 112-116) includes a communication interface and/or a processor (and possibly other possible circuitries, components, elements, etc.) to support communications with other device(s) and to generate and process signals for such communications. The communication interface and/or the processor operate to perform various operations and functions to effectuate such communications (e.g., the communication interface and the processor may be configured to perform certain operation(s) in conjunction with one another, cooperatively, dependently with one another, etc. and other operation(s) separately, independently from one another, etc.). In some examples, such a processor includes all capability, functionality, and/or circuitry, etc. to perform such operations as described herein. In some other examples, such a communication interface includes all capability, functionality, and/or circuitry, etc. to perform such operations as described herein. In even other examples, such a processor and a communication interface include all capability, functionality, and/or circuitry, etc. to perform such operations as described herein, at least in part, cooperatively with one another.

In an example of implementation and operation, a wireless communication device (e.g., any one of the WDEVs 118-132 and BSs or APs 112-116) includes a processor that generates a first orthogonal frequency division multiple access (OFDMA) packet for transmission via a communication channel. In some examples, the first OFDMA packet includes a first long training field (LTF) that includes a first binary sequence mapped onto a plurality of OFDMA sub-carriers. In some examples, the first binary sequence includes values of +1, 0, and −1. The processor generates a second OFDMA packet for transmission via the communication channel. In some examples, the second OFDMA packet is twice as long as the first OFDMA packet and includes a second LTF that includes a second binary sequence mapped onto the plurality of OFDMA sub-carriers. In some examples, the second binary sequence is different than the first binary sequence and includes the values of +1, 0, and −1. The processor then transmits the first OFDMA packet to a first other wireless communication device (e.g., any other one of the WDEVs 118-132 and BSs or APs 112-116) via the communication channel using a first resource unit (RU) allocation of a plurality of RU allocations. The processor then transmits the second OFDMA packet to at least one of the first other wireless communication device or a second wireless communication device wireless communication device (e.g., any other one of the WDEVs 118-132 and BSs or APs 112-116) via the communication channel using the first RU allocation or a second resource unit (RU) allocation of the plurality of RU allocations. In some examples, each RU allocation of the plurality of RU allocations specifies a respective one or more RUs of one or more RU sizes for the communication channel, and wherein peak to average power ratio (PAPR) of at least one of the first LTF or the second LTF increases across the plurality of RU allocations as size of the one or more RU sizes increases across the plurality of RU allocations.

FIG. 2A is a diagram illustrating an embodiment 201 of dense deployment of wireless communication devices (shown as WDEVs in the diagram). Any of the various WDEVs 210-234 may be access points (APs) or wireless stations (STAs). For example, WDEV 210 may be an AP or an AP-operative STA that communicates with WDEVs 212, 214, 216, and 218 that are STAs. WDEV 220 may be an AP or an AP-operative STA that communicates with WDEVs 222, 224, 226, and 228 that are STAs. In certain instances, at least one additional AP or AP-operative STA may be deployed, such as WDEV 230 that communicates with WDEVs 232 and 234 that are STAs. The STAs may be any type of one or more wireless communication device types including wireless communication devices 118-132, and the APs or AP-operative STAs may be any type of one or more wireless communication devices including as BSs or APs 112-116. Different groups of the WDEVs 210-234 may be partitioned into different basic services sets (BSSs). In some instances, at least one of the WDEVs 210-234 are included within at least one overlapping basic services set (OBSS) that cover two or more BSSs. As described above with the association of WDEVs in an AP-STA relationship, one of the WDEVs may be operative as an AP and certain of the WDEVs can be implemented within the same basic services set (BSS).

This disclosure presents novel architectures, methods, approaches, etc. that allow for improved spatial re-use for next generation WiFi or wireless local area network (WLAN) systems. Next generation WiFi systems are expected to improve performance in dense deployments where many clients and APs are packed in a given area (e.g., which may be an area [indoor and/or outdoor] with a high density of devices, such as a train station, airport, stadium, building, shopping mall, arenas, convention centers, colleges, downtown city centers, etc. to name just some examples). Large numbers of devices operating within a given area can be problematic if not impossible using prior technologies.

In an example of implementation and operation, WDEV 210 generates a first orthogonal frequency division multiple access (OFDMA) packet for transmission via a communication channel. In some examples, the first OFDMA packet includes a first long training field (LTF) that includes a first binary sequence mapped onto a plurality of OFDMA sub-carriers. In some examples, the first binary sequence includes values of +1, 0, and −1. The WDEV 210 generates a second OFDMA packet for transmission via the communication channel. In some examples, the second OFDMA packet is twice as long as the first OFDMA packet and includes a second LTF that includes a second binary sequence mapped onto the plurality of OFDMA sub-carriers. In some examples, the second binary sequence is different than the first binary sequence and includes the values of +1, 0, and −1. The WDEV 210 then transmits the first OFDMA packet to a first other wireless communication device (e.g., WDEV 212) via the communication channel using a first resource unit (RU) allocation of a plurality of RU allocations. The WDEV 210 then transmits the second OFDMA packet to at least one of the first other wireless communication device (e.g., WDEV 212) or a second wireless communication device wireless communication device (e.g., WDEV 214) via the communication channel using the first RU allocation or a second resource unit (RU) allocation of the plurality of RU allocations. In some examples, each RU allocation of the plurality of RU allocations specifies a respective one or more RUs of one or more RU sizes for the communication channel, and wherein peak to average power ratio (PAPR) of at least one of the first LTF or the second LTF increases across the plurality of RU allocations as size of the one or more RU sizes increases across the plurality of RU allocations.

FIG. 2B is a diagram illustrating an example 202 of communication between wireless communication devices. A wireless communication device 310 (e.g., which may be any one of devices 118-132 as with reference to FIG. 1) is in communication with another wireless communication device 390 (and/or any number of other wireless communication devices up through another wireless communication device 391) via a transmission medium. The wireless communication device 310 includes a communication interface 320 to perform transmitting and receiving of at least one signal, symbol, packet, frame, etc. (e.g., using a transmitter 322 and a receiver 324) (note that general reference to packet or frame may be used interchangeably).

Generally speaking, the communication interface 320 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the device 310 operates), equalization, pre-equalization, metric generation, symbol mapping and/or de-mapping, automatic gain control (AGC) operations, and/or any other operations that may be performed by an AFE and/or PHY component within a wireless communication device.

In some implementations, the wireless communication device 310 also includes a processor 330, and an associated memory 340, to execute various operations including interpreting at least one signal, symbol, packet, and/or frame transmitted to wireless communication device 390 and/or received from the wireless communication device 390 and/or wireless communication device 391. The wireless communication devices 310 and 390 (and/or 391) may be implemented using at least one integrated circuit in accordance with any desired configuration or combination of components, modules, etc. within at least one integrated circuit. Also, the wireless communication devices 310, 390, and/or 391 may each include one or more antennas for transmitting and/or receiving of at least one packet or frame (e.g., WDEV 390 may include m antennae, and WDEV 391 may include n antennae).

Also, in some examples, note that one or more of the processor 330, the communication interface 320 (including the TX 322 and/or RX 324 thereof), and/or the memory 340 may be implemented in one or more "processing modules," "processing circuits," "processors," and/or "processing units". Considering one example, one processor 330a may be implemented to include the processor 330, the communication interface 320 (including the TX 322 and/or RX 324 thereof), and the memory 340. Considering another example, two or more processors may be implemented to include the processor 330, the communication interface 320 (including the TX 322 and/or RX 324 thereof), and the memory 340. In such examples, such a "processor" or "processors" is/are configured to perform various operations, functions, communications, etc. as described herein. In general, the various elements, components, etc. shown within the device 310 may be implemented in any number of "processing modules," "processing circuits," "processors," and/or "processing units" (e.g., 1, 2, . . . , and generally using N such "processing modules," "processing circuits," "processors," and/or "processing units", where N is a positive integer greater than or equal to 1).

In some examples, the device 310 includes both processor 330 and communication interface 320 configured to perform various operations. In other examples, the device 310 includes processor 330a configured to perform various operations. Generally, such operations include generating, transmitting, etc. signals intended for one or more other devices (e.g., device 390 through 391) and receiving, processing, etc. other signals received for one or more other devices (e.g., device 390 through 391).

FIG. 2C is a diagram illustrating another example 203 of communication between wireless communication devices. The communication interface 320 of wireless communication device (WDEV) 310 is configured to receive a first signal from another wireless communication device (e.g., WDEV 390) and/or transmit a second signal to the other wireless communication device (e.g., WDEV 390). At or during a first time (time 1, or DT1), the WDEV 310 receives a packet (alternatively referred to as a frame) from WDEV 390. Alternatively, at or during a first time (time 1, or DT1), the WDEV 310 transmits a packet (alternatively referred to as a frame) to WDEV 390. Then, at or during a second time (time 2, or DT2), the WDEV 310 processes the packet determine the information therein. The frame may be implemented to include various fields including those described below (e.g., short training field (STF), long training field (LTF), signal field (SIG), data, etc.). In some examples, an STF and/or LTF included therein is based on a sequence that is selected to reduce or eliminate peak to average power ratio (PAPR) between the STF field (and/or LTF field) and the at least one other field of the frame.

A device can process STFs and/or LTFs for many purposes including to identify that a frame is about to start, to synchronize timers, to select an antenna configuration, to set receiver gain, to set up certain the modulation parameters for the remainder of the packet, to perform channel estimation for uses such as beamforming, etc. In some examples, one or more STFs are used for gain adjustment (e.g., such as automatic gain control (AGC) adjustment), and a given STF may be repeated one or more times (e.g., repeated 1 time in one example). In some examples, one or more LTFs are used for channel estimation, channel characterization, etc. (e.g., such as for determining a channel response, a channel transfer function, etc.), and a given LTF may be repeated one or more times (e.g., repeated up to 8 times in one example).

In an example of implementation and operation, WDEV 310 generates a first orthogonal frequency division multiple access (OFDMA) packet for transmission via a communication channel. In some examples, the first OFDMA packet includes a first long training field (LTF) that includes a first binary sequence mapped onto a plurality of OFDMA sub-carriers. In some examples, the first binary sequence includes values of +1, 0, and −1. The WDEV 310 generates a second OFDMA packet for transmission via the communication channel. In some examples, the second OFDMA packet is twice as long as the first OFDMA packet and includes a second LTF that includes a second binary sequence mapped onto the plurality of OFDMA sub-carriers. In some examples, the second binary sequence is different than the first binary sequence and includes the values of +1, 0, and −1. The WDEV 310 then transmits the first OFDMA packet to WDEV 390 via the communication channel using a first resource unit (RU) allocation of a plurality of RU allocations. The WDEV 310 then transmits the second OFDMA packet to the WDEV 390 and/or WDEV 391 via the communication channel using the first RU allocation or a second resource unit (RU) allocation of the plurality of RU allocations. In some examples, each RU allocation of the plurality of RU allocations specifies a respective one or more RUs of one or more RU sizes for the communication channel, and wherein peak to average power ratio (PAPR) of at least one of the first LTF or the second LTF increases across the plurality of RU allocations as size of the one or more RU sizes increases across the plurality of RU allocations.

In another example of implementation and operation, WDEV 310 generates a third OFDMA packet for transmission via the communication channel, wherein the third OFDMA packet is one-half as long as the first OFDMA packet and includes a third LTF that includes a third binary sequence mapped onto the plurality of OFDMA sub-carriers based on a predetermined spacing pattern, wherein the third binary sequence is different than the first binary sequence and the second binary sequence and includes the values of +1, 0, and −1, and transmits the third OFDMA packet to WDEV 390, WDEV 391, and/or another WDEV via the communication channel. In some examples, the communication channel includes a 20 MHz communication channel. In some other examples, each of the first binary sequence and the second binary sequence is mapped onto the plurality of OFDMA sub-carriers based on indices ranging from −122 to +122, and the predetermined spacing pattern specifies a sub-carrier spacing of 4 for elements of the third binary sequence mapped onto the plurality of OFDMA sub-carriers based on indices ranging from −120 to +120.

In another example of implementation and operation, WDEV 310 generates a third OFDMA packet for transmission via another communication channel that is 8 times larger than the communication channel, wherein the third OFDMA packet includes a third LTF that includes a third binary sequence mapped onto a first subset of another plurality of OFDMA sub-carriers followed by a plurality of 0s followed a fourth binary sequence mapped onto a second subset of the another plurality of OFDMA sub-carriers, wherein the communication channel includes a 20 MHz communication channel, and wherein the another communication channel includes a 160 MHz communication channel. The WDEV 310 then transmits the third OFDMA packet to WDEV 390, WDEV 391, and/or another WDEV via the communication channel.

In some examples, a first ratio of first pilots to first data within a first RU size within the one or more RU sizes is greater than a second ratio of second pilots to second data within a second RU size that is larger than the first RU size within the one or more RU sizes.

In another example of implementation and operation, the WDEV 310 includes both a processor to perform many of the operations described above and also includes a communication interface, coupled to the processor, that is configured to support communications within a satellite communication system, a wireless communication system, a wired communication system, a fiber-optic communication system, and/or a mobile communication system. The processor is configured to transmit the first OFDMA packet and/or the second OFDMA packet to WDEV 390 and/or WDEV 391 via the communication interface.

FIG. 3A is a diagram illustrating an example 301 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and packets/frames. Note that sub-carrier or tone may be used interchangeably. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, a processor and the communication interface of a communication device may be configured to perform forward error correction (FEC) and/or error checking and correction (ECC) code of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

FIG. 3B is a diagram illustrating another example 302 of OFDM and/or OFDMA. A transmitting device transmits modulation symbols via the sub-carriers. Note that such modulation symbols may include data modulation symbols, pilot modulation symbols (e.g., for use in channel estimation, characterization, etc.) and/or other types of modulation symbols (e.g., with other types of information included therein). OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. In addition, a cyclic prefix (CP) and/or cyclic suffix (CS) (shown in right hand side of FIG. 3A) that may be a copy of the CP may also be employed within the guard interval to allow switching time (e.g., such as when jumping to a new communication channel or sub-channel) and to help maintain orthogonality of the OFDM and/or OFDMA symbols. Generally speaking, an OFDM and/or OFDMA system design is based on the expected delay spread within the communication system (e.g., the expected delay spread of the communication channel).

In a single-user system in which one or more OFDM symbols or OFDM packets/frames are transmitted between a transmitter device and a receiver device, all of the sub-carriers or tones are dedicated for use in transmitting modulated data between the transmitter and receiver devices. In a multiple user system in which one or more OFDM symbols or OFDM packets/frames are transmitted between a transmitter device and multiple recipient or receiver devices, the various sub-carriers or tones may be mapped to different respective receiver devices as described below with respect to FIG. 3C.

FIG. 3C is a diagram illustrating another example 303 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of sub-carriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first packet/frame, a second assignment for second packet/frame, etc.). An OFDM packet/frame may include more than one OFDM symbol. Similarly, an OFDMA packet/frame may include more than one OFDMA symbol. In addition, such sub-carrier/tone assignment may be dynamic among different respective symbols within a given packet/frame or superframe (e.g., a first assignment for a first OFDMA symbol within a packet/frame, a second assignment for a second OFDMA symbol within the packet/frame, etc.). Generally speaking, an OFDMA symbol is a particular type of OFDM symbol, and general reference to OFDM symbol herein includes both OFDM and OFDMA symbols (and general reference to OFDM packet/frame herein includes both OFDM and OFDMA packets/frames, and vice versa). FIG. 3C shows example 303 where the assignments of sub-carriers to different users are intermingled among one another (e.g., sub-carriers assigned to a first user includes non-adjacent sub-carriers and at least one sub-carrier assigned to a second user is located in between two sub-carriers assigned to the first user). The different groups of sub-carriers associated with each user may be viewed as being respective channels of a plurality of channels that compose all of the available sub-carriers for OFDM signaling.

FIG. 3D is a diagram illustrating another example 304 of OFDM and/or OFDMA. In this example 304, the assignments of sub-carriers to different users are located in different groups of adjacent sub-carriers (e.g., first sub-carriers assigned to a first user include first adjacently located sub-carrier group, second sub-carriers assigned to a second user include second adjacently located sub-carrier group, etc.). The different groups of adjacently located sub-carriers associated with each user may be viewed as being respective channels of a plurality of channels that compose all of the available sub-carriers for OFDM signaling.

FIG. 3E is a diagram illustrating an example 305 of single-carrier (SC) signaling. SC signaling, when compared to OFDM signaling, includes a singular relatively wide channel across which signals are transmitted. In contrast, in OFDM, multiple narrowband sub-carriers or narrowband sub-channels span the available frequency range, bandwidth, or spectrum across which signals are transmitted within the narrowband sub-carriers or narrowband sub-channels.

Generally, a communication device may be configured to include a processor and the communication interface (or alternatively a processor, such a processor 330a shown in FIG. 2B) configured to process received OFDM and/or OFDMA symbols and/or frames (and/or SC symbols and/or frames) and to generate such OFDM and/or OFDMA symbols and/or frames (and/or SC symbols and/or frames).

In prior IEEE 802.11 legacy prior standards, protocols, and/or recommended practices, including those that operate in the 2.4 GHz and 4 GHz frequency bands, certain preambles are used. For use in the development of a new standard, protocol, and/or recommended practice, a new preamble design is presented herein that permits classification of all current preamble formats while still enabling the classification of a new format by new devices. In addition, various embodiments, examples, designs, etc. of new short training fields (STFs) and long training fields (LTFs) are presented herein.

FIG. 4A is a diagram illustrating an example 401 of an OFDM/A packet. This packet includes at least one preamble symbol followed by at least one data symbol. The at least one preamble symbol includes information for use in identifying, classifying, and/or categorizing the packet for appropriate processing.

FIG. 4B is a diagram illustrating another example 402 of an OFDM/A packet of a second type. This packet also includes a preamble and data. The preamble is composed of at least one short training field (STF), at least one long training field (LTF), and at least one signal field (SIG). The data is composed of at least one data field. In both this example 402 and the prior example 401, the at least one data symbol and/or the at least one data field may generally be referred to as the payload of the packet. Among other purposes, STFs and LTFs can be used to assist a device to identify that a frame is about to start, to synchronize timers, to select an antenna configuration, to set receiver gain, to set up certain the modulation parameters for the remainder of the packet, to perform channel estimation for uses such as beamforming, etc. In some examples, one or more STFs are used for gain adjustment (e.g., such as automatic gain control (AGC) adjustment), and a given STF may be repeated one or more times (e.g., repeated 1 time in one example). In some examples, one or more LTFs are used for channel estimation, channel characterization, etc. (e.g., such as for determining a channel response, a channel transfer function, etc.), and a given LTF may be repeated one or more times (e.g., repeated up to 8 times in one example).

Among other purposes, the SIGs can include various information to describe the OFDM packet including certain attributes as data rate, packet length, number of symbols within the packet, channel width, modulation encoding, modulation coding set (MCS), modulation type, whether the packet as a single or multiuser frame, frame length, etc. among other possible information. This disclosure presents a means by which a variable length second at least one SIG can be used to include any desired amount of information. By using at least one SIG that is a variable length, different amounts of information may be specified therein to adapt for any situation.

Various examples are described below for possible designs of a preamble for use in wireless communications as described herein.

FIG. 4C is a diagram illustrating another example 403 of at least one portion of an OFDM/A packet of another type.

A field within the packet may be copied one or more times therein (e.g., where N is the number of times that the field is copied, and N is any positive integer greater than or equal to one). This copy may be a cyclically shifted copy. The copy may be modified in other ways from the original from which the copy is made.

FIG. 4D is a diagram illustrating another example 404 of an OFDM/A packet of a third type. In this example 404, the OFDM/A packet includes one or more fields followed by one of more first signal fields (SIG(s) 1) followed by one of more second signal fields (SIG(s) 2) followed by and one or more data field.

FIG. 4E is a diagram illustrating another example 405 of an OFDM/A packet of a fourth type. In this example 405, the OFDM/A packet includes one or more first fields followed by one of more first signal fields (SIG(s) 1) followed by one or more second fields followed by one of more second signal fields (SIG(s) 2) followed by and one or more data field.

FIG. 4F is a diagram illustrating another example 406 of an OFDM/A packet. Such a general preamble format may be backward compatible with prior IEEE 802.11 prior standards, protocols, and/or recommended practices.

In this example 406, the OFDM/A packet includes a legacy portion (e.g., at least one legacy short training field (STF) shown as L-STF, legacy signal field (SIG) shown as L-SIG) and a first signal field (SIG) (e.g., VHT [Very High Throughput] SIG (shown as SIG-A)). Then, the OFDM/A packet includes one or more other VHT portions (e.g., VHT short training field (STF) shown as VHT-STF, one or more VHT long training fields (LTFs) shown as VHT-LTF, a second SIG (e.g., VHT SIG (shown as SIG-B)), and one or more data symbols.

Various diagrams below are shown that depict at least a portion (e.g., preamble) of various OFDM/A packet designs.

FIG. 5A is a diagram illustrating another example 501 of an OFDM/A packet. In this example 501, the OFDM/A packet includes a signal field (SIG) and/or a repeat of that SIG that corresponds to a prior or legacy communication standard, protocol, and/or recommended practice relative to a newer, developing, etc. communication standard, protocol, and/or recommended practice (shown as L-SIG/R-L-SIG) followed by a first at least one SIG based on a newer, developing, etc. communication standard, protocol, and/or recommended practice (shown as HE-SIG-A1, e.g., where HE corresponds to high efficiency) followed by a second at least one SIG based on a newer, developing, etc. communication standard, protocol, and/or recommended practice (shown as HE-SIG-A2, e.g., where HE again corresponds to high efficiency) followed by a short training field (STF) based on a newer, developing, etc. communication standard, protocol, and/or recommended practice (shown as HE-STF, e.g., where HE again corresponds to high efficiency) followed by one or more fields.

FIG. 5B is a diagram illustrating another example 502 of an OFDM/A packet. In this example 502, the OFDM/A packet includes a signal field (SIG) and/or a repeat of that SIG that corresponds to a prior or legacy communication standard, protocol, and/or recommended practice relative to a newer, developing, etc. communication standard, protocol, and/or recommended practice (shown as L-SIG/R-L-SIG) followed by a first at least one SIG based on a newer, developing, etc. communication standard, protocol, and/or recommended practice (shown as HE-SIG-A1, e.g., where HE corresponds to high efficiency) followed by a second at least one SIG based on a newer, developing, etc. communication standard, protocol, and/or recommended practice (shown as HE-SIG-A2, e.g., where HE again corresponds to high efficiency) followed by a third at least one SIG based on a newer, developing, etc. communication standard, protocol, and/or recommended practice (shown as HE-SIG-A3, e.g., where HE again corresponds to high efficiency) followed by a fourth at least one SIG based on a newer, developing, etc. communication standard, protocol, and/or recommended practice (shown as HE-SIG-A4, e.g., where HE again corresponds to high efficiency) followed by a STF based on a newer, developing, etc. communication standard, protocol, and/or recommended practice (shown as HE-STF, e.g., where HE again corresponds to high efficiency) followed by one or more fields.

FIG. 5C is a diagram illustrating another example 502 of an OFDM/A packet. In this example 503, the OFDM/A packet includes a signal field (SIG) and/or a repeat of that SIG that corresponds to a prior or legacy communication standard, protocol, and/or recommended practice relative to a newer, developing, etc. communication standard, protocol, and/or recommended practice (shown as L-SIG/R-L-SIG) followed by a first at least one SIG based on a newer, developing, etc. communication standard, protocol, and/or recommended practice (shown as HE-SIG-A1, e.g., where HE corresponds to high efficiency) followed by a second at least one SIG based on a newer, developing, etc. communication standard, protocol, and/or recommended practice (shown as HE-SIG-A2, e.g., where HE again corresponds to high efficiency) followed by a third at least one SIG based on a newer, developing, etc. communication standard, protocol, and/or recommended practice (shown as HE-SIG-B, e.g., where HE again corresponds to high efficiency) followed by a STF based on a newer, developing, etc. communication standard, protocol, and/or recommended practice (shown as HE-STF, e.g., where HE again corresponds to high efficiency) followed by one or more fields. This example 503 shows a distributed SIG design that includes a first at least one SIG-A (e.g., HE-SIG-A1 and HE-SIG-A2) and a second at least one SIG-B (e.g., HE-SIG-B).

FIG. 5D is a diagram illustrating another example 504 of an OFDM/A packet. This example 504 depicts a type of OFDM/A packet that includes a preamble and data. The preamble is composed of at least one short training field (STF), at least one long training field (LTF), and at least one signal field (SIG).

In this example 504, the preamble is composed of at least one short training field (STF) that corresponds to a prior or legacy communication standard, protocol, and/or recommended practice relative to a newer, developing, etc. communication standard, protocol, and/or recommended practice (shown as L-STF(s)) followed by at least one long training field (LTF) that corresponds to a prior or legacy communication standard, protocol, and/or recommended practice relative to a newer, developing, etc. communication standard, protocol, and/or recommended practice (shown as L-LTF(s)) followed by at least one SIG that corresponds to a prior or legacy communication standard, protocol, and/or recommended practice relative to a newer, developing, etc. communication standard, protocol, and/or recommended practice (shown as L-SIG(s)) and optionally followed by a repeat (e.g., or cyclically shifted repeat) of the L-SIG(s) (shown as RL-SIG(s)) followed by another at least one SIG based on a newer, developing, etc. communication standard, protocol, and/or recommended practice (shown as HE-SIG-A, e.g., where HE again corresponds to high efficiency) followed by another at least one STF based on a newer, developing, etc. communication standard, protocol, and/or recommended practice (shown as HE-STF(s), e.g., where HE again corresponds to high efficiency) followed by another at least one LTF based on a newer, developing, etc. communication standard, protocol, and/or recommended practice (shown as HE-LTF(s), e.g., where HE again corresponds to high efficiency) followed by at least one packet extension followed by one or more fields.

FIG. 5E is a diagram illustrating another example 505 of an OFDM/A packet. In this example 505, the preamble is composed of at least one field followed by at least one SIG that corresponds to a prior or legacy communication standard, protocol, and/or recommended practice relative to a newer, developing, etc. communication standard, protocol, and/or recommended practice (shown as L-SIG(s)) and optionally followed by a repeat (e.g., or cyclically shifted repeat) of the L-SIG(s) (shown as RL-SIG(s)) followed by another at least one SIG based on a newer, developing, etc. communication standard, protocol, and/or recommended practice (shown as HE-SIG-A, e.g., where HE again corresponds to high efficiency) followed by one or more fields.

Note that information included in the various fields in the various examples provided herein may be encoded using various encoders. In some examples, two independent binary convolutional code (BCC) encoders are implemented to encode information corresponding to different respective modulation coding sets (MCSs) that are can be selected and/or optimized with respect to, among other things, the respective payload on the respective channel. Various communication channel examples are described with respect to FIG. 7D below.

Also, in some examples, a wireless communication device generates content that is included in the various SIGs (e.g., SIGA and/or SIGB) to signal MCS(s) to one or more other wireless communication devices to instruct which MCS(s) for those one or more other wireless communication devices to use with respect to one or more communications. In addition, in some examples, content included in a first at least one SIG (e.g., SIGA) include information to specify at least one operational parameter for use in processing a second at least one SIG (e.g., SIGB) within the same OFDM/A packet.

Various OFDM/A frame structures are presented herein for use in communications between wireless communication devices and specifically showing OFDM/A frame structures corresponding to one or more resource units (RUs). Such OFDM/A frame structures may include one or more RUs. Note that these various examples may include different total numbers of sub-carriers, different numbers of data sub-carriers, different numbers of pilot sub-carriers, etc. Different RUs may also have different other characteristics (e.g., different spacing between the sub-carriers, different sub-carrier densities, implemented within different frequency bands, etc.).

FIG. 6A is a diagram illustrating an example 601 of selection among different OFDM/A frame structures for use in communications between wireless communication devices and specifically showing OFDM/A frame structures corresponding to one or more resource units (RUs). This diagram may be viewed as having some similarities to allocation of sub-carriers to different users as shown in FIG. 4D and also shows how each OFDM/A frame structure is associated with one or more RUs. Note that these various examples may include different total numbers of sub-carriers, different numbers of data sub-carriers, different numbers of pilot sub-carriers, etc. Different RUs may also have different other characteristics (e.g., different spacing between the sub-carriers, different sub-carrier densities, implemented within different frequency bands, etc.).

In one example, OFDM/A frame structure 1 351 is composed of at least one RU 1 651. In one example, OFDM/A frame structure 1 351 is composed of at least one RU 1 651 and at least one RU 2 652. In another example, OFDM/A frame structure 1 351 is composed of at least one RU 1 651, at least one RU 2 652, and at least one RU m 653. Similarly, the OFDM/A frame structure 2 352 up through OFDM/A frame structure n 353 may be composed of any combinations of the various RUs (e.g., including any one or more RU selected from the RU 1 651 through RU m 653).

FIG. 6B is a diagram illustrating an example 602 of various types of different resource units (RUs). In this example 602, RU 1 651 includes A1 total sub-carrier(s), A2 data (D) sub-carrier(s), A3 pilot (P) sub-carrier(s), and A4 unused sub-carrier(s). RU 2 652 includes B1 total sub-carrier(s), B2 D sub-carrier(s), B3 P sub-carrier(s), and B4 unused sub-carrier(s). RU N 653 includes C1 total sub-carrier(s), C2 D sub-carrier(s), C3 P sub-carrier(s), and C4 unused sub-carrier(s).

Considering the various RUs (e.g., across RU 1 651 to RU N 653), the total number of sub-carriers across the RUs increases from RU 1 651 to RU N 653 (e.g., A1<B1<C1). Also, considering the various RUs (e.g., across RU 1 651 to RU N 653), the ratio of pilot sub-carriers to data sub-carriers across the RUs decreases from RU 1 651 to RU N 653 (e.g., A3/A2>B3/B2>C3/C2).

In some examples, note that different RUs can include a different number of total sub-carriers and a different number of data sub-carriers yet include a same number of pilot sub-carriers.

As can be seen, this disclosure presents various options for mapping of data and pilot sub-carriers (and sometimes unused sub-carriers that include no modulation data or are devoid of modulation data) into OFDMA frames or packets (note that frame and packet may be used interchangeably herein) in various communications between communication devices including both the uplink (UL) and downlink (DL) such as with respect to an access point (AP). Note that a user may generally be understood to be a wireless communication device implemented in a wireless communication system (e.g., a wireless station (STA) or an access point (AP) within a wireless local area network (WLAN/WiFi)). For example, a user may be viewed as a given wireless communication device (e.g., a wireless station (STA) or an access point (AP), or an AP-operative STA within a wireless communication system). This disclosure discussed localized mapping and distributed mapping of such sub-carriers or tones with respect to different users in an OFDMA context (e.g., such as with respect to FIG. 4C and FIG. 4D including allocation of sub-carriers to one or more users).

Some versions of the IEEE 802.11 standard have the following physical layer (PHY) fast Fourier transform (FFT) sizes: 32, 64, 128, 256, 512.

These PHY FFT sizes are mapped to different bandwidths (BWs) (e.g., which may be achieved using different down-clocking ratios or factors applied to a first clock signal to generate different other clock signals such as a second clock signal, a third clock signal, etc.). In many locations, this disclosure refers to FFT sizes instead of BW since FFT size determines a user's specific allocation of sub-carriers, RUs, etc. and the entire system BW using one or more mappings of sub-carriers, RUs, etc.

This disclosure presents various ways by which the mapping of N users's data into the system BW tones (localized or distributed). For example, if the system BW uses 256 FFT, modulation data for 8 different users can each use a 32 FFT, respectively. Alternatively, if the system BW uses 256

FFT, modulation data for 4 different users can each use a 64 FFT, respectively. In another alternative, if the system BW uses 256 FFT, modulation data for 2 different users can each use a 128 FFT, respectively. Also, any number of other combinations is possible with unequal BW allocated to different users such as 32 FFT to 2 users, 64 FFT for one user, and 128 FFT for the last user.

Localized mapping (e.g., contiguous sub-carrier allocations to different users such as with reference to FIG. 3D) is preferable for certain applications such as low mobility users (e.g., that remain stationary or substantially stationary and whose location does not change frequently) since each user can be allocated to a sub-band based on at least one characteristic. An example of such a characteristic includes allocation to a sub-band that maximizes its performance (e.g., highest SNR or highest capacity in multi-antenna system). The respective wireless communication devices (users) receive frames or packets (e.g., beacons, null data packet (NDP), data, etc. and/or other frame or packet types) over the entire band and feedback their preferred sub-band or a list of preferred sub-bands. Alternatively, a first device (e.g., transmitter, AP, or STA) transmits at least one OFDMA packet to a second communication device, and the second device (e.g., receiver, a STA, or another STA) may be configured to measure the first device's initial transmission occupying the entire band and choose a best/good or preferable sub-band. The second device can be configured to transmit the selection of the information to the first device via feedback, etc.

In some examples, a device is configured to employ PHY designs for 32 FFT, 64 FFT and 128 FFT as OFDMA blocks inside of a 256 FFT system BW. When this is done, there can be some unused sub-carriers (e.g., holes of unused sub-carriers within the provisioned system BW being used). This can also be the case for the lower FFT sizes. In some examples, when an FFT is an integer multiple of another, the larger FFT can be a duplicate a certain number of times of the smaller FFT (e.g., a 512 FFT can be an exact duplicate of two implementations of 256 FFT). In some examples, when using 256 FFT for system BW the available number of tones is 242 that can be split among the various users that belong to the OFDMA frame or packet (DL or UL).

In some examples, a PHY design can leave gaps of sub-carriers between the respective wireless communication devices (users) (e.g., unused sub-carriers). For example, users 1 and 4 may each use a 32 FFT structure occupying a total of 26×2=52 sub-carriers, user 2 may use a 64 FFT occupying 56 sub-carriers and user 3 may use 128 FFT occupying 106 sub-carriers adding up to a sum total of 214 sub-carriers leaving 28 sub-carriers unused.

In another example, only 32 FFT users are multiplexed allowing up to 9 users with 242 sub-carriers–(9 users×26 RUs)=8 unused sub-carriers between the users. In yet another example, for 64 FFT users are multiplexed with 242 sub-carriers–(4 users×56 RUs)=18 unused sub-carriers.

The unused sub-carriers can be used to provide better separation between users especially in the UL where users's energy can spill into each other due to imperfect time/frequency/power synchronization creating inter-carrier interference (ICI).

FIG. 7A is a diagram illustrating another example 701 of various types of different RUs. In this example 701, RU 1 includes X1 total sub-carrier(s), X2 data (D) sub-carrier(s), X3 pilot (P) sub-carrier(s), and X4 unused sub-carrier(s). RU 2 includes Y1 total sub-carrier(s), Y2 D sub-carrier(s), Y3 P sub-carrier(s), and Y4 unused sub-carrier(s). RU q includes Z1 total sub-carrier(s), Z2 D sub-carrier(s), Z3 P sub-carrier(s), and Z4 unused sub-carrier(s). In this example 701, note that different RUs can include different spacing between the sub-carriers, different sub-carrier densities, implemented within different frequency bands, span different ranges within at least one frequency band, etc.

FIG. 7B is a diagram illustrating another example 702 of various types of different RUs. This diagram shows RU 1 that includes 26 contiguous sub-carriers that include 24 data sub-carriers, and 2 pilot sub-carriers; RU 2 that includes 52 contiguous sub-carriers that include 48 data sub-carriers, and 4 pilot sub-carriers; RU 3 that includes 106 contiguous sub-carriers that include 102 data sub-carriers, and 4 pilot sub-carriers; RU 4 that includes 242 contiguous sub-carriers that include 234 data sub-carriers, and 8 pilot sub-carriers; RU 5 that includes 484 contiguous sub-carriers that include 468 data sub-carriers, and 16 pilot sub-carriers; and RU 6 that includes 996 contiguous sub-carriers that include 980 data sub-carriers, and 16 pilot sub-carriers.

Note that RU 2 and RU 3 include a first/same number of pilot sub-carriers (e.g., 4 pilot sub-carriers each), and RU 5 and RU 6 include a second/same number of pilot sub-carriers (e.g., 16 pilot sub-carriers each). The number of pilot sub-carriers remains same or increases across the RUs. Note also that some of the RUs include an integer multiple number of sub-carriers of other RUs (e.g., RU 2 includes 52 total sub-carriers, which is 2× the 26 total sub-carriers of RU 1, and RU 5 includes 242 total sub-carriers, which is 2× the 242 total sub-carriers of RU 4).

FIG. 7C is a diagram illustrating an example 703 of various types of communication protocol specified physical layer (PHY) fast Fourier transform (FFT) sizes. The device 310 is configured to generate and transmit OFDMA packets based on various PHY FFT sizes as specified within at least one communication protocol. Some examples of PHY FFT sizes, such as based on IEEE 802.11, include PHY FFT sizes such as 32, 64, 128, 256, 512, 1024, and/or other sizes.

In one example, the device 310 is configured to generate and transmit an OFDMA packet based on RU 1 that includes 26 contiguous sub-carriers that include 24 data sub-carriers, and 2 pilot sub-carriers and to transmit that OFDMA packet based on a PHY FFT 32 (e.g., the RU 1 fits within the PHY FFT 32). In one example, the device 310 is configured to generate and transmit an OFDMA packet based on RU 2 that includes 52 contiguous sub-carriers that include 48 data sub-carriers, and 4 pilot sub-carriers and to transmit that OFDMA packet based on a PHY FFT 56 (e.g., the RU 2 fits within the PHY FFT 56). The device 310 uses other sized RUs for other sized PHY FFTs based on at least one communication protocol.

Note also that any combination of RUs may be used. In another example, the device 310 is configured to generate and transmit an OFDMA packet based on two RUs based on RU 1 and one RU based on RU 2 based on a PHY FFT 128 (e.g., two RUs based on RU 1 and one RU based on RU 2 includes a total of 104 sub-carriers). The device 310 is configured to generate and transmit any OFDMA packets based on any combination of RUs that can fit within an appropriately selected PHY FFT size of at least one communication protocol.

Note also that any given RU may be sub-divided or partitioned into subsets of sub-carriers to carry modulation data for one or more users (e.g., such as with respect to FIG. 3C or FIG. 3D).

FIG. 7D is a diagram illustrating an example 704 of different channel bandwidths and relationship there between. In one example, a device (e.g., the device 310) is configured to generate and transmit any OFDMA packet based on any of a number of OFDMA frame structures within various communication channels having various channel bandwidths. For example, a 160 MHz channel may be subdivided into two 80 MHz channels. An 80 MHz channel may be subdivided into two 40 MHz channels. A 40 MHz channel may be subdivided into two 20 MHz channels. Note also such channels may be located within the same frequency band, the same frequency sub-band or alternatively among different frequency bands, different frequency sub-bands, etc.

Additional more sequences are provided below that may be used for construction of long training field (LTF) portion(s) of a preamble of a packet. Additional examples of various binary 2× and 4× High Efficiency (HE)-long training field (LTF) sequences are proposed for application within various applications (e.g., including those compliant with developing standards, protocols, and/or recommended practices including the developing IEEE 802.11ax). Various 4× and 2×HE-LTF sequence examples provided below are constructed using various sized resource units (RUs) (e.g., size 26, 52, 106, 242, 484, 996, RU(s)).

An example of a 20 MHz 1×HE-LTF sequence is provided below:

20 MHz 1×HE-LTF Sequence (60 tones+1 DC)

This example LTF is constructed as follows:

$LTF_{20\ MHz}(-120:4:120)=$

[−1, +1, +1, −1, +1, −1, +1, +1, +1, +1, −1, −1, +1, +1, +1, −1, −1, −1, +1, −1, −1, +1, +1, −1, −1, +1, −1, −1, +1, −1, 0, −1, +1, +1, +1, +1, +1, +1, −1, −1, −1, −1, −1, +1, −1, −1, −1, +1, −1, −1, +1, −1, −1, +1, −1, +1, −1, −1, −1, −1, −1];

This includes 4 Pilots at the following indices: [−116, −48, +48, +116]

This provides PAPR=3.88, 3.97, 3.98 dB (1, 2 and 6 phases $R_{HELTF}$ vs. $P_{HELTF}$)

An example of a 20 MHz 2×HE-LTF sequence is provided below:

20 MHz 2×HE-LTF sequence

LTF242(−122:2:122)=[−1, −1, −1, +1, +1, −1, +1, −1, −1, −1, −1, +1, −1, +1, −1, −1, +1, +1, −1, +1, +1, +1, +1, +1, −1, +1, −1, +1, −1, −1, +1, +1, −1, +1, −1, −1, −1, −1, +1, −1, +1, +1, +1, −1, −1, +1, −1, −1, −1, −1, +1, −1, −1, −1, +1, +1, +1, −1, −1, +1, 0, +1, −1, +1, +1, −1, +1, +1, −1, +1, +1, −1, +1, −1, +1, +1, +1, +1, −1, +1, −1, +1, +1, −1, −1, −1, −1, −1, −1, −1, +1, −1, +1, +1, −1, −1, −1, −1, +1, −1, +1, −1, +1, −1, −1, −1, −1, +1, −1, +1, +1, +1, +1, −1, −1, +1, −1, −1, −1, −1, −1, +1, −1, +1];

With showing 0 values elements, the HE-LTF sequence above will be represented as follows:

20 MHz 2×HE-LTF sequence

LTF242(−122:122)=[−1, 0, −1, 0, −1, 0, +1, 0, +1, 0, −1, 0, +1, 0, −1, 0, −1, 0, −1, 0, −1, 0, +1, 0, −1, 0, +1, 0, −1, 0, −1, 0, +1, 0, +1, 0, −1, 0, +1, 0, +1, 0, +1, 0, +1, 0, +1, 0, −1, 0, +1, 0, −1, 0, +1, 0, −1, 0, −1, 0, +1, 0, +1, 0, +1, 0, +1, 0, +1, 0, +1, 0, −1, 0, +1, 0, +1, 0, +1, 0, −1, 0, −1, 0, −1, 0, −1, 0, −1, 0, +1, 0, −1, 0, +1, 0, +1, 0, −1, 0, −1, 0, −1, 0, −1, 0, +1, 0, −1, 0, +1, 0, +1, 0, −1, 0, +1, 0, +1, 0, 0, 0, +1, 0, −1, 0, +1, 0, +1, 0, −1, 0, +1, 0, +1, 0, −1, 0, +1, 0, +1, 0, −1, 0, −1, 0, +1, 0, −1, 0, +1, 0, +1, 0, −1, 0, −1, 0, +1, 0, −1, 0, +1, 0, −1, 0, −1, 0, +1, 0, +1, 0, −1, 0, +1, 0, +1, 0, −1, 0, +1, 0, +1, 0, −1, 0, +1, 0, +1, 0, −1, 0, +1, 0, +1, 0, −1, 0, +1, 0, −1, 0, −1, 0, −1, 0, −1, 0, +1, 0, −1, 0, +1]

An example of a 20 MHz 4×HE-LTF sequence is provided below:

20 MHz 4×HE-LTF sequence

LTF242(−122:122)=[−1, −1, +1, −1, +1, −1, +1, +1, +1, −1, +1, +1, +1, −1, −1, +1, −1, −1, −1, −1, −1, +1, +1, −1, −1, −1, −1, +1, +1, −1, +1, −1, +1, +1, +1, +1, −1, +1, −1, −1, +1, +1, −1, +1, +1, +1, +1, −1, −1, +1, −1, −1, −1, +1, +1, +1, +1, −1, +1, +1, −1, −1, −1, −1, +1, −1, +1, −1, −1, +1, +1, +1, −1, +1, −1, +1, +1, −1, −1, −1, −1, −1, −1, +1, +1, −1, +1, +1, +1, +1, −1, +1, −1, −1, +1, +1, +1, −1, +1, −1, +1, −1, −1, −1, −1, −1, −1, +1, +1, −1, +1, +1, +1, −1, +1, +1, +1, 0, 0, 0, −1, +1, −1, +1, −1, +1, −1, +1, +1, +1, −1, −1, +1, −1, −1, −1, +1, +1, −1, +1, +1, +1, −1, +1, +1, +1, −1, +1, −1, −1, −1, +1, +1, +1, −1, −1, +1, +1, −1, +1, −1, +1, +1, −1, −1, −1, −1, +1, −1, +1, −1, −1, +1, +1, −1, +1, −1, +1, +1, −1, +1, −1, −1, −1, +1, +1, +1, +1, −1, +1, +1, −1, −1, +1, +1, −1, +1, +1, +1, +1, −1, +1, +1, −1, −1, +1, +1, +1, +1, +1, −1, +1, +1, −1, −1, +1, +1, −1, −1, −1, +1, −1, +1, −1, +1, +1];

Reusing the primary Channel LTF with A modification for secondary Channel

80 MHz 4×HE-LTF Primary Sequence (e.g., in [2])

$LTF_{80\ MHz\_primary}(-500:500)= \dots$

[+1, +1, −1, +1, −1, +1, −1, −1, −1, +1, +1, −1, +1, +1, +1, +1, +1, −1, −1, +1, +1, +1, +1, −1, +1, −1, ...

+1, −1, −1, +1, +1, −1, +1, +1, +1, +1, −1, −1, +1, −1, −1, −1, −1, +1, +1, +1, −1, −1, −1, −1, −1, −1, +1, +1, +1, +1, +1, ...

+1, −1, +1, +1, +1, −1, +1, +1, −1, −1, −1, +1, −1, +1, −1, −1, +1, +1, −1, +1, −1, +1, +1, +1, +1, +1, −1, −1, +1, +1, ...

+1, −1, +1, +1, −1, −1, −1, +1, −1, +1, +1, −1, +1, +1, +1, +1, −1, −1, +1, +1, +1, +1, −1, −1, +1, +1, +1, +1, +1, −1, ...

+1, +1, −1, −1, −1, +1, −1, −1, −1, +1, −1, +1, −1, +1, −1, +1, −1, +1, +1, +1, +1, +1, +1, −1, +1, +1, +1, −1, −1, +1, ...

−1, −1, −1, −1, +1, −1, −1, −1, −1, +1, −1, −1, +1, +1, −1, −1, +1, −1, −1, −1, +1, +1, −1, +1, +1, +1, ...

−1, −1, +1, −1, +1, +1, −1, +1, +1, +1, +1, +1, +1, −1, +1, +1, +1, −1, +1, +1, −1, −1, −1, +1, −1, +1, −1, ...

+1, +1, −1, +1, −1, +1, +1, +1, +1, −1, −1, +1, +1, +1, −1, +1, +1, −1, −1, +1, −1, +1, +1, −1, +1, −1, −1, ...

−1, −1, +1, −1, +1, −1, +1, −1, +1, +1, +1, −1, +1, +1, +1, −1, +1, −1, −1, −1, −1, +1, −1, −1, −1, ...

−1, +1, −1, +1, +1, −1, −1, +1, −1, −1, −1, +1, −1, +1, −1, +1, +1, +1, −1, −1, +1, +1, +1, +1, −1, +1, −1, −1, ...

−1, −1, −1, +1, −1, −1, +1, −1, −1, +1, +1, +1, −1, +1, −1, +1, +1, −1, −1, +1, −1, +1, −1, −1, −1, +1, ...

+1, −1, +1, −1, −1, +1, −1, −1, −1, +1, −1, +1, −1, +1, +1, −1, +1, −1, +1, −1, +1, +1, −1, +1, +1, +1, −1, +1, +1, ...

−1, +1, −1, −1, −1, −1, +1, −1, −1, −1, +1, −1, −1, −1, −1, +1, −1, +1, −1, +1, +1, +1, +1, +1, −1, ...

+1, −1, +1, +1, −1, −1, +1, −1, −1, −1, +1, +1, −1, +1, +1, ...

+1, +1, −1, −1, −1, +1, +1, +1, +1, −1, −1, +1, +1, +1, +1, +1, +1, −1, +1, +1, +1, −1, +1, +1, −1, −1, −1, +1, −1, +1, . . .
−1, −1, +1, +1, −1, +1, −1, +1, +1, +1, +1, +1, −1, −1, +1, +1, +1, −1, +1, +1, −1, −1, −1, +1, −1, +1, +1, −1, +1, +1, . . .
−1, +1, −1, −1, −1, +1, −1, +1, −1, −1, −1, −1, +1, +1, +1, −1, −1, +1, 0, 0, 0, 0, 0, +1, −1, −1, −1, −1, −1, −1, . . .
+1, −1, +1, +1, −1, −1, +1, +1, −1, +1, −1, +1, +1, −1, −1, +1, −1, +1, −1, −1, −1, +1, +1, −1, +1, +1, +1, −1, +1, +1, . . .
+1, +1, +1, +1, +1, −1, +1, −1, −1, +1, −1, −1, +1, −1, +1, +1, −1, −1, +1, −1, −1, −1, +1, +1, −1, −1, −1, −1, −1, . . .
+1, −1, −1, −1, −1, −1, +1, +1, −1, −1, −1, −1, −1, +1, −1, −1, +1, +1, +1, −1, +1, +1, +1, −1, +1, −1, +1, −1, −1, −1, . . .
−1, −1, +1, +1, +1, −1, −1, −1, −1, +1, −1, −1, +1, +1, +1, −1, +1, +1, −1, −1, +1, −1, +1, −1, −1, −1, −1, −1, −1, −1, . . .
+1, +1, −1, −1, −1, +1, −1, −1, +1, +1, +1, −1, +1, −1, −1, +1, −1, −1, +1, −1, +1, +1, +1, −1, +1, −1, −1, +1, +1, −1, . . .
+1, −1, +1, +1, +1, −1, −1, +1, −1, −1, −1, +1, −1, −1, −1, −1, −1, −1, +1, −1, +1, +1, −1, +1, +1, −1, +1, −1, −1, . . .
−1, +1, +1, −1, +1, +1, +1, −1, −1, +1, +1, +1, +1, −1, +1, −1, −1, −1, −1, +1, +1, −1, −1, −1, −1, −1, +1, −1, −1, . . .
+1, +1, +1, −1, +1, +1, +1, −1, −1, +1, −1, −1, −1, −1, −1, +1, +1, −1, −1, −1, −1, +1, −1, −1, +1, +1, +1, −1, . . .
+1, +1, −1, −1, +1, −1, +1, −1, +1, +1, +1, −1, +1, −1, +1, +1, −1, +1, −1, +1, +1, +1, −1, −1, +1, −1, −1, −1, . . .
−1, −1, −1, −1, −1, −1, −1, +1, −1, +1, −1, +1, +1, −1, +1, −1, −1, −1, +1, +1, −1, +1, +1, +1, −1, −1, +1, +1, . . .
+1, +1, −1, +1, +1, +1, +1, +1, −1, −1, +1, +1, +1, +1, +1, −1, +1, +1, −1, −1, −1, +1, −1, −1, −1, +1, −1, +1, −1, . . .
+1, +1, +1, +1, −1, −1, −1, +1, +1, +1, +1, −1, +1, +1, −1, −1, −1, +1, −1, −1, +1, +1, −1, +1, −1, +1, −1, −1, −1, −1, . . .
−1, −1, +1, −1, −1, +1, −1, −1, +1, +1, +1, +1, +1, −1, +1, −1, −1, +1, −1, +1, +1, +1, −1, +1, −1, +1, −1, −1, +1, . . .
+1, −1, +1, −1, +1, +1, +1, −1, −1, +1, −1, −1, −1, −1, −1, −1, −1, −1, −1, −1, +1, −1, +1, +1, −1, +1, +1, +1, −1, . . .
−1, −1, −1, +1, −1, +1, +1, +1, −1, −1, +1, +1, +1, +1, −1, +1, −1, −1, −1, −1, +1, +1, −1, −1, −1, −1, +1, . . .
−1, −1, +1, +1, −1, +1, +1, +1, −1, +1, −1, +1, −1, −1, −1, +1, +1, +1, −1, −1, −1, +1, −1, −1, +1, . . .
+1, −1, +1, +1, −1, −1, +1, −1, +1, −1, +1];

80 MHz 2×HE-LTF Primary Sequence (e.g., in [2])
LTF$_{80\ MHz\_primary}$(−500:2:500)= . . .
[+1, +1, −1, +1, +1, +1, −1, +1, +1, +1, +1, −1, −1, −1, +1, −1, −1, +1, −1, +1, +1, +1, −1, −1, −1, −1, +1, +1, . . .
+1, −1, +1, +1, +1, −1, +1, −1, −1, +1, −1, −1, −1, +1, +1, −1, −1, −1, +1, −1, −1, +1, −1, +1, +1, −1, +1, +1, −1, +1, . . .

Figure 8:
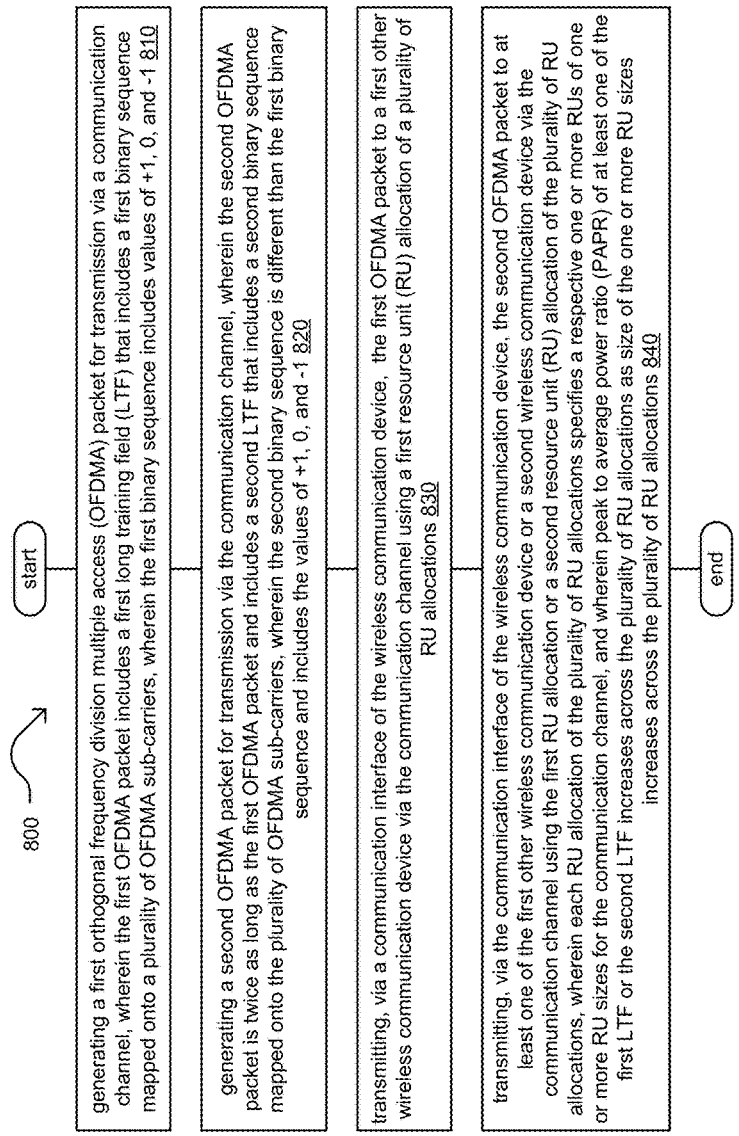
FIG. 8 is a diagram illustrating an embodiment of a method for execution by at least one wireless communication device.

−1, −1, −1, +1, −1, −1, −1, −1, +1, −1, −1, +1, +1, −1, +1, +1, +1, −1, −1, −1, −1, +1, −1, +1, +1, +1, −1, +1, +1, +1, . . .
+1, −1, −1, −1, +1, +1, +1, −1, −1, +1, +1, +1, −1, +1, +1, −1, +1, −1, −1, −1, −1, +1, −1, −1, −1, +1, −1, +1, +1, −1, . . .
+1, +1, −1, −1, −1, +1, −1, −1, −1, +1, −1, +1, +1, −1, +1, +1, +1, −1, −1, +1, +1, +1, −1, +1, +1, −1, +1, −1, −1, +1, . . .
−1, +1, +1, +1, −1, +1, +1, +1, +1, −1, −1, −1, +1, −1, −1, +1, +1, −1, +1, +1, +1, −1, −1, −1, −1, +1, +1, +1, −1, . . .
−1, −1, +1, −1, −1, −1, +1, −1, +1, +1, +1, −1, −1, +1, +1, +1, −1, +1, +1, −1, −1, −1, −1, +1, −1, −1, −1, +1, . . .
−1, +1, +1, −1, +1, +1, −1, +1, +1, −1, −1, +1, −1, −1, −1, +1, +1, +1, +1, −1, +1, −1, −1, −1, +1, −1, −1, −1, −1, +1, . . .
+1, +1, +1, −1, −1, −1, +1, +1, +1, 0, 0, 0, +1, −1, −1, +1, +1, −1, +1, −1, −1, −1, +1, +1, +1, +1, −1, +1, +1, +1, . . .
−1, +1, −1, −1, −1, −1, +1, +1, +1, −1, +1, +1, −1, −1, +1, −1, −1, +1, −1, −1, +1, −1, +1, +1, +1, −1, +1, +1, +1, . . .
−1, +1, −1, +1, −1, +1, −1, −1, +1, +1, −1, −1, −1, +1, −1, +1, +1, +1, +1, −1, +1, +1, +1, −1, −1, −1, +1, +1, +1, . . .
−1, −1, −1, +1, −1, −1, +1, +1, −1, +1, +1, +1, +1, −1, −1, −1, −1, +1, . . .
−1, +1, −1, −1, −1, +1, −1, +1, +1, −1, +1, −1, −1, −1, −1, +1, +1, −1, −1, −1, −1, +1, −1, +1, −1, +1, −1, −1, −1, . . .
−1, −1, −1, −1, +1, −1, +1, +1, −1, +1, +1, +1, +1, −1, +1, +1, +1, −1, . . .
−1, −1, −1, −1, +1, +1, −1, +1, +1, −1, −1, −1, +1, −1, −1, +1, −1, +1, −1, . . .
−1, −1, +1, −1, −1, −1, +1, +1, −1, −1, −1, +1, −1, −1, +1, −1, +1, +1, +1, −1, +1, +1, +1, +1, −1, −1, −1, +1, . . .
−1, −1, +1, −1, −1, −1, +1, −1, −1, −1, +1, −1, +1, −1, . . .
−1, −1, +1, −1, −1, −1, +1, +1, −1, −1, −1, +1, −1, −1, +1, −1, +1, +1, +1, −1, +1, +1, +1, −1, . . .
+1, −1, +1, +1, −1, −1, +1, −1, −1, −1, +1, +1, +1, +1, −1, +1, +1, −1, +1, +1, +1, −1, +1];

160 MHz 4×HE-LTF Construct for minimum PAPR
LTF$_{80\ MHz\_secondary}$=[LTF$_{80\ MHz\_primary}$(−500:−1), −LTF$_{80\ MHz\_primary}$(0:500)];
Secondary above Primary channel (++ and +−)
<<LTF$_{160\ MHz}$=[+LTF$_{80\ MHz\_primary}$, zeros(1,23), +LTF$_{80\ MHz\_secondary}$]>>; % PAPR=7.12 dB FIG. 8 is a diagram illustrating an embodiment of a method 800 for execution by at least one wireless communication device. The method 800 begins by generating a first orthogonal frequency division multiple access (OFDMA) packet for transmission via a communication channel, wherein the first OFDMA packet includes a first long training field (LTF) that includes a first binary sequence mapped onto a plurality of OFDMA sub-carriers, wherein the first binary sequence includes values of +1, 0, and −1 (block 810).

The method 800 continues by generating a second OFDMA packet for transmission via the communication channel, wherein the second OFDMA packet is twice as long as the first OFDMA packet and includes a second LTF that includes a second binary sequence mapped onto the plurality of OFDMA sub-carriers, wherein the second binary sequence is different than the first binary sequence and includes the values of +1, 0, and −1 (block 820).

The method 800 then operates by transmitting, via a communication interface of the wireless communication device, the first OFDMA packet to a first other wireless communication device via the communication channel using a first resource unit (RU) allocation of a plurality of RU allocations (block 830).

The method 800 continues by transmitting, via the communication interface of the wireless communication device, the second OFDMA packet to at least one of the first other wireless communication device or a second wireless communication device via the communication channel using the first RU allocation or a second resource unit (RU) allocation of the plurality of RU allocations, wherein each RU allocation of the plurality of RU allocations specifies a respective one or more RUs of one or more RU sizes for the communication channel, and wherein peak to average power ratio (PAPR) of at least one of the first LTF or the second LTF increases across the plurality of RU allocations as size of the one or more RU sizes increases across the plurality of RU allocations (block 840).

FIG. 9 is a diagram illustrating an example 900 of quadrature amplitude modulation (QAM) data peak to average power ratio (PAPR) (shown as cumulative distribution function (CDF) as a function of PAPR (dB)).

As can be seen in the diagram, peak to average power ratio (PAPR) of one or more LTFs increases across the various RU allocations as size of the one or more RU sizes increases across the RU allocations. The LTF sequences designs presented herein and based on the principles herein allow for higher PAPR as RU size increases. The LTF designs are optimized with respect to a particular RU size. In one example, the LTF sequence(s) is/are designs and optimized with respect to a smallest RU size (e.g., a RU size of 26 such as with 2 pilots in each RU 26). In addition, there is an overall optimization in the design of the LTF(s) based on the overall RU allocation associated with a sub-carrier/tone plan with respective RU allocations of respective RU sizes to ensure minimization of PAPR across those RU allocations while also allowing the PAPR to increase (e.g., increase linearly in one example) as the RU size increases across the RU allocations. In general, this LTF design is to ensure that the relatively smallest RU within the sub-carrier/tone plan has a smallest PAPR while the PAPR is permitted to increase (e.g., increase linearly in one example) as the RU size increases across the RU allocations. In accordance with such a design, the RU allocation with the relatively largest RU within the sub-carrier/tone plan has a largest permitted PAPR.

It is noted that the various operations and functions described within various methods herein may be performed within a wireless communication device (e.g., such as by the processor 330, communication interface 320, and memory 340 or processor 330a such as described with reference to FIG. 2B) and/or other components therein. Generally, a communication interface and processor in a wireless communication device can perform such operations.

Examples of some components may include one of more baseband processing modules, one or more media access control (MAC) layer components, one or more physical layer (PHY) components, and/or other components, etc. For example, such a processor can perform baseband processing operations and can operate in conjunction with a radio, analog front end (AFE), etc. The processor can generate such signals, packets, frames, and/or equivalents etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennae. In some embodiments, such processing is performed cooperatively by a processor in a first device and another processor within a second device. In other embodiments, such processing is performed wholly by a processor within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
   a processor configured to:
      generate a first orthogonal frequency division multiple access (OFDMA) packet for transmission via a communication channel, wherein the first OFDMA packet includes a first long training field (LTF) that includes a first binary sequence mapped onto a plurality of OFDMA sub-carriers, wherein the first binary sequence includes values of +1, 0, and −1;
      generate a second OFDMA packet for transmission via the communication channel, wherein the second OFDMA packet is twice as long as the first OFDMA packet and includes a second LTF that includes a second binary sequence mapped onto the plurality of OFDMA sub-carriers, wherein the second binary sequence is different than the first binary sequence and includes the values of +1, 0, and −1;
      transmit the first OFDMA packet to a first other wireless communication device via the communication channel using a first resource unit (RU) allocation of a plurality of RU allocations; and
      transmit the second OFDMA packet to at least one of the first other wireless communication device or a second wireless communication device via the communication channel using the first RU allocation or a second resource unit (RU) allocation of the plurality of RU allocations, wherein each RU allocation of the plurality of RU allocations specifies a respective one or more RUs of one or more RU sizes for the communication channel, and wherein peak to average power ratio (PAPR) of at least one of the first LTF or the second LTF increases across the plurality of RU allocations as size of the one or more RU sizes increases across the plurality of RU allocations.

2. The wireless communication device of claim 1, wherein the processor is further configured to:
   generate a third OFDMA packet for transmission via the communication channel, wherein the third OFDMA packet is one-half as long as the first OFDMA packet and includes a third LTF that includes a third binary sequence mapped onto the plurality of OFDMA sub-carriers based on a predetermined spacing pattern, wherein the third binary sequence is different than the first binary sequence and the second binary sequence and includes the values of +1, 0, and −1; and transmit the third OFDMA packet to at least one of the first other wireless communication device, the second wireless communication device, or a third other wireless communication device via the communication channel.

3. The wireless communication device of claim 2, wherein:

the communication channel includes a 20 MHz communication channel;

each of the first binary sequence and the second binary sequence is mapped onto the plurality of OFDMA sub-carriers based on indices ranging from −122 to +122; and the predetermined spacing pattern specifies a sub-carrier spacing of 4 for elements of the third binary sequence mapped onto the plurality of OFDMA sub-carriers based on indices ranging from −120 to +120.

4. The wireless communication device of claim 1, wherein the processor is further configured to:

generate a third OFDMA packet for transmission via another communication channel that is 8 times larger than the communication channel, wherein the third OFDMA packet includes a third LTF that includes a third binary sequence mapped onto a first subset of another plurality of OFDMA sub-carriers followed by a plurality of 0s followed a fourth binary sequence mapped onto a second subset of the another plurality of OFDMA sub-carriers, wherein the communication channel includes a 20 MHz communication channel, and wherein the another communication channel includes a 160 MHz communication channel; and transmit the third OFDMA packet to at least one of the first other wireless communication device, the second wireless communication device, or a third other wireless communication device via the communication channel.

5. The wireless communication device of claim 1, wherein a first ratio of first pilots to first data within a first RU size within the one or more RU sizes is greater than a second ratio of second pilots to second data within a second RU size that is larger than the first RU size within the one or more RU sizes.

6. The wireless communication device of claim 1 further comprising:

a communication interface, coupled to the processor, that is configured to support communications within at least one of a satellite communication system, a wireless communication system, a wired communication system, a fiber-optic communication system, or a mobile communication system; and the processor configured to transmit at least one of the first OFDMA packet or the second OFDMA packet to at least one of the first other wireless communication device or the second wireless communication device via the communication interface.

7. The wireless communication device of claim 1 further comprising:

a wireless station (STA), wherein at least one of the first other wireless communication device or the second wireless communication device includes an access point (AP).

8. The wireless communication device of claim 1 further comprising:

an access point (AP), wherein at least one of the first other wireless communication device or the second wireless communication device includes a wireless station (STA).

9. A wireless communication device comprising:

a processor configured to:

generate a first orthogonal frequency division multiple access (OFDMA) packet for transmission via a 20 MHz communication channel, wherein the first OFDMA packet includes a first long training field (LTF) that includes a first binary sequence mapped onto a plurality of OFDMA sub-carriers, wherein the first binary sequence includes values of +1, 0, and −1;

generate a second OFDMA packet for transmission via the 20 MHz communication channel, wherein the second OFDMA packet is twice as long as the first OFDMA packet and includes a second LTF that includes a second binary sequence mapped onto the plurality of OFDMA sub-carriers, wherein the second binary sequence is different than the first binary sequence and includes the values of +1, 0, and −1;

generate a third OFDMA packet for transmission via the communication channel, wherein the third OFDMA packet is one-half as long as the first OFDMA packet and includes a third LTF that includes a third binary sequence mapped onto the plurality of OFDMA sub-carriers based on a predetermined spacing pattern, wherein the third binary sequence is different than the first binary sequence and the second binary sequence and includes the values of +1, 0, and −1;

transmit the first OFDMA packet to a first other wireless communication device via the 20 MHz communication channel using a first resource unit (RU) allocation of a plurality of RU allocations; and transmit the second OFDMA packet to at least one of the first other wireless communication device or a second wireless communication device via the 20 MHz communication channel using the first RU allocation or a second resource unit (RU) allocation of the plurality of RU allocations; and transmit the third OFDMA packet to at least one of the first other wireless communication device, the second wireless communication device, or a third other wireless communication device via the communication channel, wherein each RU allocation of the plurality of RU allocations specifies a respective one or more RUs of one or more RU sizes for the 20 MHz communication channel, and wherein peak to average power ratio (PAPR) of at least one of the first LTF or the second LTF increases across the plurality of RU allocations as size of the one or more RU sizes increases across the plurality of RU allocations.

10. The wireless communication device of claim 9, wherein:

the communication channel includes a 20 MHz communication channel;

each of the first binary sequence and the second binary sequence is mapped onto the plurality of OFDMA sub-carriers based on indices ranging from −122 to +122; and the predetermined spacing pattern specifies a sub-carrier spacing of 4 for elements of the third binary sequence mapped onto the plurality of OFDMA sub-carriers based on indices ranging from −120 to +120.

11. The wireless communication device of claim 9 further comprising:
  a communication interface, coupled to the processor, that is configured to support communications within at least one of a satellite communication system, a wireless communication system, a wired communication system, a fiber-optic communication system, or a mobile communication system; and
  the processor configured to transmit at least one of the first OFDMA packet, the second OFDMA packet, or the second OFDMA packet to at least one of the first other wireless communication device, the second wireless communication device, or the third wireless communication device via the communication interface.

12. The wireless communication device of claim 9 further comprising:
  a wireless station (STA), wherein at least one of the first other wireless communication device or the second wireless communication device includes an access point (AP).

13. The wireless communication device of claim 9 further comprising:
  an access point (AP), wherein at least one of the first other wireless communication device or the second wireless communication device includes a wireless station (STA).

14. A method for execution by a wireless communication device, the method comprising:
  generating a first orthogonal frequency division multiple access (OFDMA) packet for transmission via a communication channel, wherein the first OFDMA packet includes a first long training field (LTF) that includes a first binary sequence mapped onto a plurality of OFDMA sub-carriers, wherein the first binary sequence includes values of +1, 0, and −1;
  generating a second OFDMA packet for transmission via the communication channel, wherein the second OFDMA packet is twice as long as the first OFDMA packet and includes a second LTF that includes a second binary sequence mapped onto the plurality of OFDMA sub-carriers, wherein the second binary sequence is different than the first binary sequence and includes the values of +1, 0, and −1;
  transmitting, via a communication interface of the wireless communication device, the first OFDMA packet to a first other wireless communication device via the communication channel using a first resource unit (RU) allocation of a plurality of RU allocations; and
  transmitting, via the communication interface of the wireless communication device, the second OFDMA packet to at least one of the first other wireless communication device or a second wireless communication device via the communication channel using the first RU allocation or a second resource unit (RU) allocation of the plurality of RU allocations, wherein each RU allocation of the plurality of RU allocations specifies a respective one or more RUs of one or more RU sizes for the communication channel, and wherein peak to average power ratio (PAPR) of at least one of the first LTF or the second LTF increases across the plurality of RU allocations as size of the one or more RU sizes increases across the plurality of RU allocations.

15. The method of claim 14 further comprising:
  generating a third OFDMA packet for transmission via the communication channel, wherein the third OFDMA packet is one-half as long as the first OFDMA packet and includes a third LTF that includes a third binary sequence mapped onto the plurality of OFDMA sub-carriers based on a predetermined spacing pattern, wherein the third binary sequence is different than the first binary sequence and the second binary sequence and includes the values of +1, 0, and −1; and
  transmitting, via the communication interface of the wireless communication device, the third OFDMA packet to at least one of the first other wireless communication device, the second wireless communication device, or a third other wireless communication device via the communication channel.

16. The method of claim 15, wherein:
  the communication channel includes a 20 MHz communication channel;
  each of the first binary sequence and the second binary sequence is mapped onto the plurality of OFDMA sub-carriers based on indices ranging from −122 to +122; and
  the predetermined spacing pattern specifies a sub-carrier spacing of 4 for elements of the third binary sequence mapped onto the plurality of OFDMA sub-carriers based on indices ranging from −120 to +120.

17. The method of claim 14 further comprising:
  generating a third OFDMA packet for transmission via another communication channel that is 8 times larger than the communication channel, wherein the third OFDMA packet includes a third LTF that includes a third binary sequence mapped onto a first subset of another plurality of OFDMA sub-carriers followed by a plurality of 0s followed a fourth binary sequence mapped onto a second subset of the another plurality of OFDMA sub-carriers, wherein the communication channel includes a 20 MHz communication channel, and wherein the another communication channel includes a 160 MHz communication channel; and
  transmitting, via the communication interface of the wireless communication device, the third OFDMA packet to at least one of the first other wireless communication device, the second wireless communication device, or a third other wireless communication device via the communication channel.

18. The method of claim 14, wherein a first ratio of first pilots to first data within a first RU size within the one or more RU sizes is greater than a second ratio of second pilots to second data within a second RU size that is larger than the first RU size within the one or more RU sizes.

19. The method of claim 14, wherein the wireless communication device includes a wireless station (STA), and at least one of the first other wireless communication device or the second wireless communication device includes an access point (AP).

20. The method of claim 14, wherein the wireless communication device includes an access point (AP), wherein at least one of the first other wireless communication device or the second wireless communication device includes a wireless station (STA).

* * * * *